US011037257B2

(12) United States Patent
Takahashi et al.

(10) Patent No.: US 11,037,257 B2
(45) Date of Patent: Jun. 15, 2021

(54) COMPUTER-READABLE RECORDING MEDIUM, CONTRACT CREATION SYSTEM, CONTRACT VERIFICATION SYSTEM, AND FINAL CIPHER CREATION SYSTEM

(71) Applicant: Konica Minolta, Inc., Tokyo (JP)

(72) Inventors: Kazuya Takahashi, Osaka (JP); Toshinobu Yamaguchi, Takarazuka (JP)

(73) Assignee: Konica Minolta, Inc., Tokyo (JP)

( * ) Notice: Subject to any disclaimer, the term of this patent is extended or adjusted under 35 U.S.C. 154(b) by 1016 days.

(21) Appl. No.: 15/085,393

(22) Filed: Mar. 30, 2016

(65) Prior Publication Data

US 2016/0292804 A1 Oct. 6, 2016

(30) Foreign Application Priority Data

Mar. 31, 2015 (JP) .............................. JP2015-072577

(51) Int. Cl.
*G06Q 50/18* (2012.01)
*H04L 9/30* (2006.01)
*H04L 9/08* (2006.01)

(52) U.S. Cl.
CPC ........... *G06Q 50/18* (2013.01); *H04L 9/0861* (2013.01); *H04L 9/30* (2013.01)

(58) Field of Classification Search
None
See application file for complete search history.

(56) References Cited

U.S. PATENT DOCUMENTS

| 5,018,196 A | * | 5/1991 | Takaragi | G06Q 20/00 380/30 |
| 5,825,906 A | * | 10/1998 | Obata | G06K 9/00154 382/119 |
| 7,039,805 B1 | * | 5/2006 | Messing | G06F 21/32 713/170 |

(Continued)

FOREIGN PATENT DOCUMENTS

| JP | 2007-026173 A | 2/2007 |
| JP | 2011-008718 A | 1/2011 |

*Primary Examiner* — Jacob C. Coppola
*Assistant Examiner* — Jason B Fenstermacher
(74) *Attorney, Agent, or Firm* — Buchanan Ingersoll & Rooney PC

(57) ABSTRACT

A computer-readable recording medium records a contract creation program for creating a contract image of a contract executed by parties each having private key. The program causes a computer to perform steps of: creating, for each party, a signature image of handwritten signature; creating, for each party, signature identification information for identifying the signature image; creating text identification information for identifying contract body text; creating, for each party, an intermediate cipher by enciphering the signature identification information of the party and the text identification information with the private key of the party; creating, for each party, a final cipher by enciphering the signature identification information of the party and the intermediate ciphers of all other parties with the private key of the party; creating an optical mark from each final cipher; and creating the contract image including the text, the signature images, and the optical marks disposed in predetermined columns.

9 Claims, 25 Drawing Sheets

(56) References Cited

U.S. PATENT DOCUMENTS

| | | | | |
|---|---|---|---|---|
| 7,934,098 B1* | 4/2011 | Hahn | .................... | G06Q 50/18 |
| | | | | 713/176 |
| 8,459,545 B1* | 6/2013 | Hammer | ................ | G06Q 30/06 |
| | | | | 235/379 |
| 8,542,889 B2* | 9/2013 | Sarnoff | ............. | G06K 9/00154 |
| | | | | 382/119 |
| 8,612,769 B2* | 12/2013 | Guenther | ................ | G06F 21/32 |
| | | | | 709/238 |
| 8,700,905 B2* | 4/2014 | Guenther | ................ | G06F 21/32 |
| | | | | 713/179 |
| 9,059,852 B2* | 6/2015 | Boloker | .................. | G06T 1/005 |
| 9,286,281 B2* | 3/2016 | Dunn | .................... | G06F 17/243 |
| 9,520,999 B2* | 12/2016 | Klevan | .................. | H04L 9/3231 |
| 9,577,831 B2* | 2/2017 | Mandal | ............... | H04L 63/0884 |
| 9,596,236 B2* | 3/2017 | Dunn | .................... | G06F 16/93 |
| 9,660,991 B2* | 5/2017 | Kamakari | .......... | H04L 63/0884 |
| 9,698,992 B2* | 7/2017 | Gertner | ................... | H04L 9/3247 |
| 10,032,065 B2* | 7/2018 | Holden | ............. | G06K 9/00154 |
| 2002/0075507 A1* | 6/2002 | Owen | .................. | G06F 3/1222 |
| | | | | 358/1.15 |
| 2002/0120856 A1* | 8/2002 | Schmidt | ............ | G05B 19/0426 |
| | | | | 713/193 |
| 2003/0012374 A1* | 1/2003 | Wu | ....................... | H04L 9/3247 |
| | | | | 380/44 |
| 2005/0036651 A1* | 2/2005 | Wen | ..................... | G06T 1/0028 |
| | | | | 382/100 |
| 2006/0112128 A1* | 5/2006 | Brants | ................ | G06F 17/2715 |
| 2006/0124728 A1* | 6/2006 | Kotovich | ............. | G06Q 20/042 |
| | | | | 235/379 |
| 2006/0271787 A1* | 11/2006 | DeYoung | .............. | H04L 9/3236 |
| | | | | 713/176 |
| 2006/0287072 A1* | 12/2006 | Walker | .................... | G07F 17/32 |
| | | | | 463/25 |
| 2006/0288236 A1* | 12/2006 | McCue | .................. | G06F 21/62 |
| | | | | 713/193 |
| 2007/0079139 A1* | 4/2007 | Kim | ........................ | G06F 21/64 |
| | | | | 713/186 |
| 2007/0277040 A1* | 11/2007 | Scheidt | .................. | H04L 9/321 |
| | | | | 713/176 |
| 2008/0016358 A1* | 1/2008 | Filreis | .................. | H04L 63/123 |
| | | | | 713/176 |
| 2009/0238626 A1* | 9/2009 | Ming | .................... | G07D 7/0043 |
| | | | | 400/76 |
| 2010/0170942 A1* | 7/2010 | Lo Iacono | .......... | G06Q 20/341 |
| | | | | 235/375 |
| 2011/0179289 A1* | 7/2011 | Guenther | ................ | G06F 21/32 |
| | | | | 713/189 |
| 2012/0213366 A1* | 8/2012 | Brown | .................. | H04L 9/3066 |
| | | | | 380/270 |
| 2014/0003675 A1* | 1/2014 | Li | .......................... | G06F 21/32 |
| | | | | 382/123 |
| 2014/0007002 A1* | 1/2014 | Chang | ................. | G06F 3/04883 |
| | | | | 715/780 |
| 2014/0310804 A1* | 10/2014 | Apostolos | ........... | H04L 63/0861 |
| | | | | 726/19 |
| 2015/0062041 A1* | 3/2015 | Kim | ..................... | G06F 3/0412 |
| | | | | 345/173 |
| 2016/0232734 A1* | 8/2016 | Guajardo Merchan | ..................... | G07D 7/004 |
| 2016/0292804 A1* | 10/2016 | Takahashi | ............. | G06Q 50/18 |
| 2017/0193461 A1* | 7/2017 | Celinder | ................ | G06Q 10/20 |

* cited by examiner

FIG. 2

Contract

The creditor Amber as the party A and the debtor Bill as the party B approved the debt and caused this debt repayment contract to be executed.

Article. 1  The party B approves that the party B bears from the party A the debt including the original principal of XX yen, the accrued and unpaid interest of XX yen, and the delay damages as the suspense receipt under the loan contract.

Article. 2  The party B shall pay installments, to the party A, the original principal included in the amount of money stated in the preceding article hereof by bringing or remitting to the party A.

Article. 3  When the party B fails to pay the amount of money stated in the preceding article hereof and thus the unpaid amount of money reaches the amount of money for two-time payments, the party B loses the profit within the time limit and shall promptly pay to the party A the remainder after subtracting the paid amount of money stated in the preceding article hereof from the total amount of money stated in Article. 1 hereof.

End

In witness whereof, this contract is created in duplicate, each party retaining one (1) copy thereof.

20XX/YY/ZZ

Creditor (A)  Amber

210A 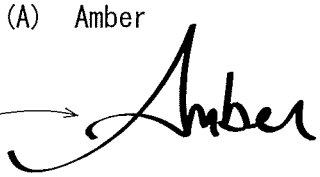

 220A

Debtor (B)  Bill

210B 

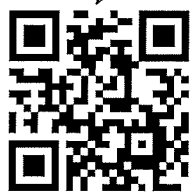 220B

First embodiment

Second embodiment

FIG. 23

Contract

The creditor Amber as the party A and the debtor Bill as the party B approved the debt and caused this debt repayment contract to be executed.

Article. 1  The party B approves that the party B bears from the party A the debt including the original principal of XX yen, the accrued and unpaid interest of XX yen, and the delay damages as the suspense receipt under the loan contract.

Article. 2  The party B shall pay installments, to the party A, the original principal included in the amount of money stated in the preceding article hereof by bringing or remitting to the party A.

Article. 3  When the party B fails to pay the amount of money stated in the preceding article hereof and thus the unpaid amount of money reaches the amount of money for two-time payments, the party B loses the profit within the time limit and shall promptly pay to the party A the remainder after subtracting the paid amount of money stated in the preceding article hereof from the total amount of money stated in Article. 1 hereof.

End

In witness whereof, this contract is created in duplicate, each party retaining one (1) copy thereof.

20XX/YY/ZZ

Creditor (A)  Amber

210A 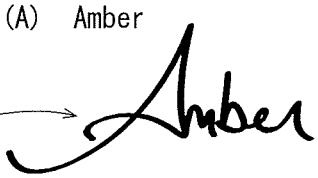

 220C

Debtor (B)  Bill

210B 

Case of two parties

Case of three or more parties

COMPUTER-READABLE RECORDING MEDIUM, CONTRACT CREATION SYSTEM, CONTRACT VERIFICATION SYSTEM, AND FINAL CIPHER CREATION SYSTEM

CROSS-REFERENCE TO RELATED APPLICATIONS

This application is based on application No. 2015-072577 filed in Japan, the contents of which are hereby incorporated by reference.

BACKGROUND OF THE INVENTION

(1) Field of the Invention

The present invention relates to a computer-readable recording medium, a contract creation system, a contract verification system, and a final cipher creation system, and in particular to technology for creating contract papers in a short time with high security.

(2) Related Art

Conventionally, when creating a contract, after both parties have agreed to the contract content, one party creates two copies of the contract, signs them, and sends them to the other party. When the other party receives the contracts, the other party signs both copies, keeps one copy as evidence, and sends the other copy back to the first party. In this way, written agreements are made.

Further, in recent years, contracts are being made using electronic contracts via the Internet. In the case of electronic contracts, first, one party prints the contract content onto paper and signs it. Then the one party scans the signed and printed contract to create a signed electronic file, and sends the signed electronic file to the other party. The other party receives the signed electronic file, prints it, and signs the printed contract. The other party then scans the signed and printed contract to create an electronic contract.

Subsequently, the parties to the contract confirm that there are no issues with the content of the electronic contract, create electronic signatures, and save the electronic contract. By doing this it becomes possible to detect tampering of the electronic contract by checking the electronic signatures.

However, when creating a paper contract, and in particular when entering a contract with an overseas party, sending the contract requires time. For example, it is not uncommon that an approximate one month is required to complete all the procedures because mailing the contract requires approximate one week for example.

Compared with this, an electronic contract can be sent and received via the Internet, and thus a reduced length of time is required to complete the contract. However, in order to securely save the electronic contract, a high security and a dedicated server safely operating for a long time are required, and this results in a high cost.

Also, signing a paper contract in handwriting has been conventionally regarded as being effective as the contract. Accordingly, an electronic contract including no handwritten signature is not regarded as being effective as the contract even if it is possible to detect whether or not the electronic contract has been tampered with. For this reason, a printed paper of the electronic content is not regarded as the authorized original, and therefore is not dealt as the evidence of the contract.

SUMMARY OF THE INVENTION

The present invention was made in view of the above problem, and aims to provide a computer-readable recording medium that records therein a program for creating a paper contract in a reduced time period necessary for contract procedure and at a high security, a contract creation system, a contract verification system, and a final cipher creation system.

In order to achieve the above aim, one aspect of the present invention provides a non-transitory computer-readable recording medium that records therein a contract creation program for creating a contract image of a contract that is executed by parties each having a private key, the contract creation program causing a computer to perform the steps of: creating, for each of the parties, a signature image of a handwritten signature of the party; creating, for each of the parties, signature identification information for uniquely identifying the signature image of the party; creating text identification information for uniquely identifying a text of a body of the contract; creating, for each of the parties, an intermediate cipher by enciphering the signature identification information of the party and the text identification information with the private key of the party; creating, for each of the parties, a final cipher by enciphering the signature identification information of the party and the respective intermediate ciphers relating to all other of the parties with the private key of the party; creating an optical mark from each of the final ciphers; and creating the contract image in which the text, the respective signature images of the parties, and the optical marks are disposed in respective predetermined columns.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 2 exemplifies a contract that is created by a contract creation system 1;

FIG. 23 exemplifies a contract that is created by a contract creation system 1 relating to the third embodiment;

DESCRIPTION OF PREFERRED
EMBODIMENTS

The following describes, taking a contract creation system as an example, embodiments of a computer-readable recording medium, a contract creation system, a contract verification system, and a final cipher creation system relating to the present invention, with reference to the drawings.

[1] First Embodiment

A contract creation system relating to the present embodiment creates a contract that is signed by two parties A and B.

In the present embodiment, description is given on an example where a party and a signer of a handwritten signature are the same person. However, the party and the signer do not necessarily need to be the same person. The present embodiment may include the case for example where a party is a corporation and a signer is a representative thereof.

Also, the parties A and B have private keys AX and BX, respectively for using the public key cryptography. One party is beforehand notified of a public key corresponding to a private key of the other party, and conversely. Specifically, the parties A and B are beforehand notified of public keys BY and AY corresponding to the private keys BX and AX, respectively.

(1) Structure of Contract Creation System

First, description is given on the structure of the contract creation system relating to the present embodiment.

Figure 1:
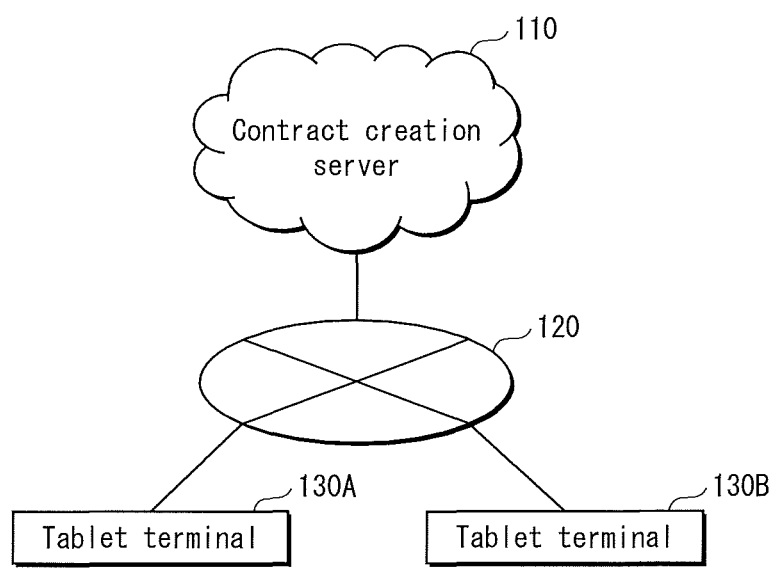
FIG. 1 shows the principal structure of a contract creation system relating to a first embodiment of the present invention.

In a contract creation system 1 as shown in FIG. 1, a contract creation server 110 and tablet terminals 130A and 130B are connected to an Internet 120. The tablet terminals 130A and 130B are used by the parties A and B, respectively. Note that connection of the tablet terminals 130A and 130B to the Internet 120 may be wired or wireless.

(2) Structure of Contract

First, the structure of a contract created by the contract creation system 1 is described.

As shown in FIG. 2, a contract 2, which is created by the contract creation system 1 relating to the present embodiment, includes a contract body 200, handwritten signatures 210A and 210B, and QR codes 220A and 220B. The QR codes 220A and 220B guarantee that the parties have signed in agreement to the contract body 200. The handwritten signatures 210A and 210B are signatures handwritten by the parties A and B, respectively.

(3) Contract Creation Procedure

Next, a contract creation procedure of the contract creation system relating to the present embodiment is described. The contract creation procedure consists of three phases of a body creation phase, a signature reception phase, and a print phase.

(3-1) Body Creation Phase

Figure 3:
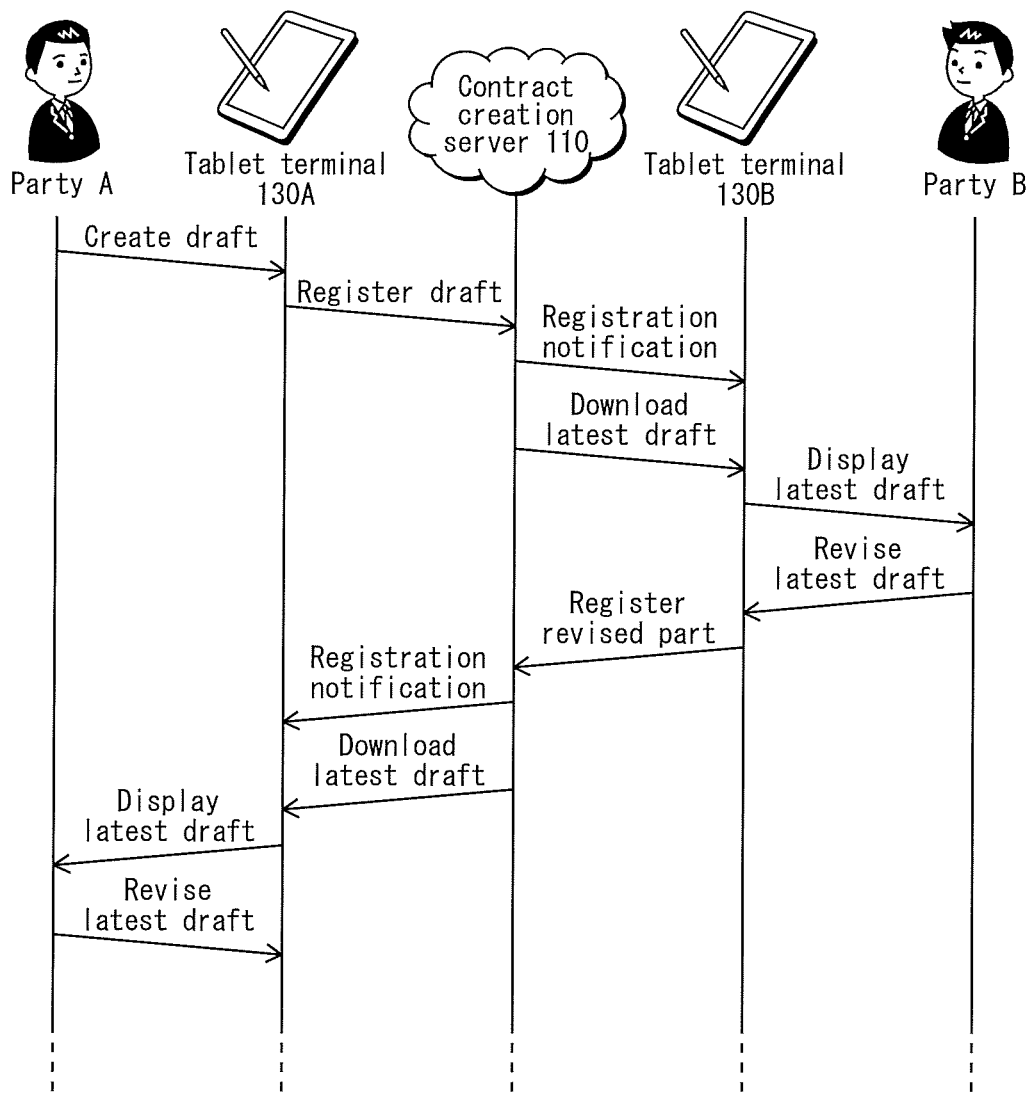
FIG. 3 is a sequence diagram describing a body creation phase in a contract creation procedure of the contract creation system 1.

First, in the text creation phase, as shown in FIG. 3, a party (the party A in an example in FIG. 3) first creates a text of a draft of a contract with use of the tablet terminal 130A, and registers the text in the contract creation server 110. Then, the contract creation server 110 sends a registration notification to the tablet terminal 130B. The tablet terminal 130B downloads and displays the text of the latest draft of the contract (text, hereinafter, referred to as the latest draft) from the contract creation server 110.

The party B checks the displayed latest draft, and revises the latest draft with use of the tablet terminal 130B. The tablet terminal 130 registers only a revised part (text) of the latest draft in the contract creation server 110. Upon receiving registration of the revised part, the contract creation server 110 sends a registration notification to the tablet terminal 130A. The tablet terminal 130A downloads and displays the latest draft, and the party A revises the latest draft. The contract body is created by repetition of revision as described above. When both the parties agree to the contract body, the body creation phase ends.

(3-2) Signature Reception Phase

Figure 4:
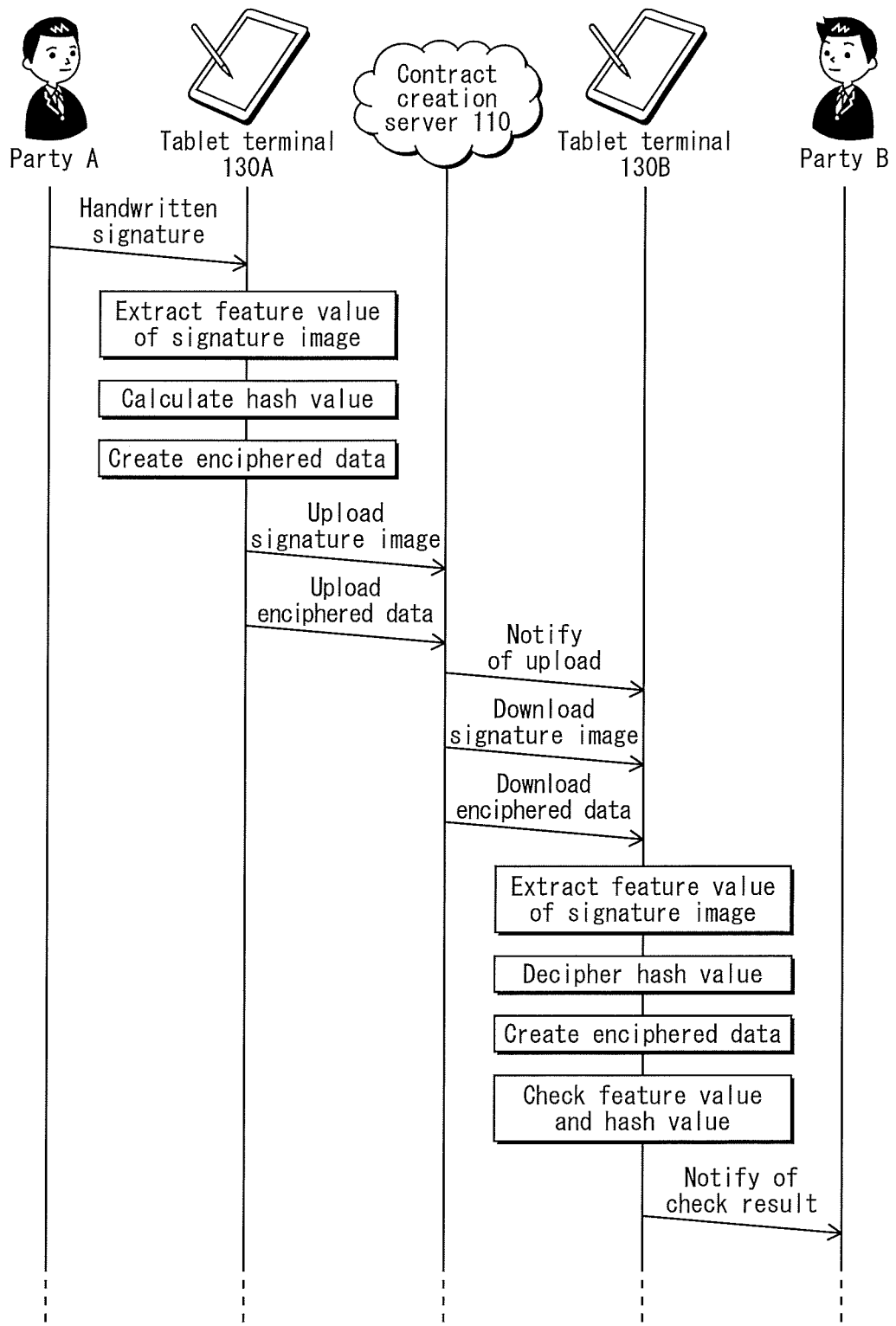
FIG. 4 is a sequence diagram describing a signature reception phase in the contract creation procedure of the contract creation system 1.

Next, in the signature reception phase, both the parties A and B sign in handwriting, and check each other's enciphered data. Note that the parties A and B do not need to sign in handwriting at the same time, and either party may sign in handwriting first. FIG. 4 shows processing and operations performed in the case where the party A signs in handwriting. The same processing and operations are also performed in the case where the party B signs in handwriting.

As shown in FIG. 4, the party A signs in handwriting by operating the tablet terminal 130A to input the handwritten signature 210A. The tablet terminal 130A extracts a feature value A0 from an image AS of the input handwritten signature 210A. Hereinafter, an image of a handwritten signature is referred to as a signature image. The feature value is for example indicated by the coordinates of the endpoint of each stroke, the coordinates of the curve point, the minimum point, the maximum point, or the like.

Next, the tablet terminal 130A calculates a hash value H0 of the contract body (text), and creates enciphered data DataA by enciphering the feature value A0 of the handwritten signature 210A and the hash value H0 of the contract body with the private key AX of the party A. Then, the tablet terminal 130A uploads the enciphered data DataA together with the signature image AS onto the contract creation server 110.

Upon receiving upload of the signature image AS and the enciphered data DataA, the contract creation server 110 sends an UL notification indicating reception of the upload to the tablet terminal 130B. The tablet terminal 130B downloads the signature image AS and the enciphered data DataA from the contract creation server 110.

The tablet terminal 130B extracts the feature value A0 from the signature image AS, and calculates the hash value H0 of the contract body if having not yet calculated it. Further, the tablet terminal 130B deciphers the enciphered data DataA with the public key AY of the party A.

Then, the tablet terminal 130B checks whether or not the feature value A0 extracted from the signature image AS and the calculated hash value H0 of the contract body match the feature value A0 and the hash value H0 which are acquired by deciphering the enciphered data DataA, respectively, and displays a check result for notifying the party B.

(3-3) Print Phase

In the print phase, the parties A and B each print the contract image which is created by the contract creation system 1.

Figure 5:
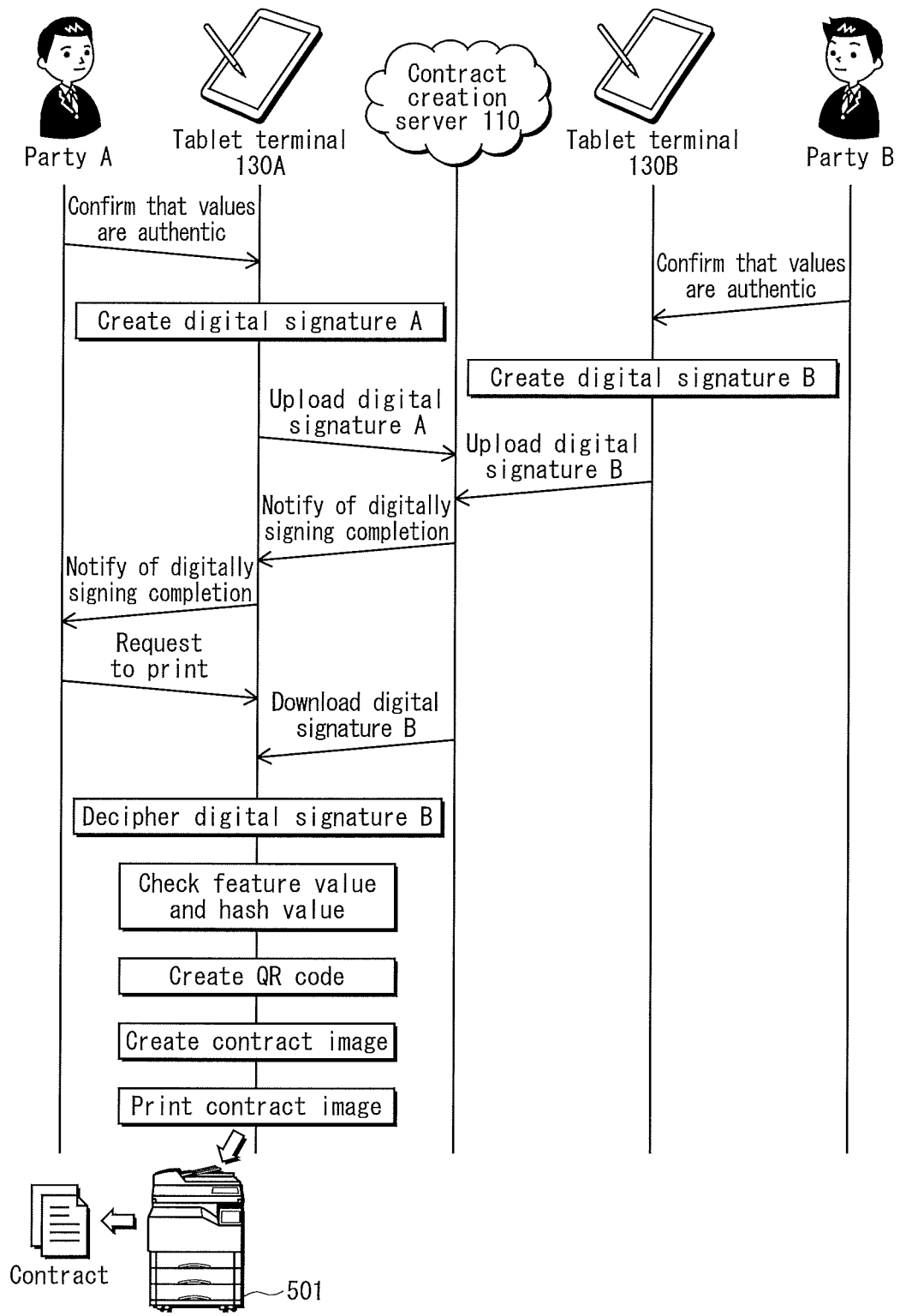
FIG. 5 is a sequence diagram describing a print phase in the contract creation procedure of the contract creation system 1.

As shown in FIG. 5, the party A confirms that the feature value B0 and the hash value H0, which are acquired by deciphering the enciphered data DataB of the party B, are authentic with use of the tablet terminal 130A. The party B confirms that the feature value A0 and the hash value H0, which are acquired by deciphering the enciphered data DataA of the party A, are authentic with use of the tablet terminal 130B. Then, the parties A and B perform operations for indicating that the feature values and the hash values are confirmed as being authentic with use of the tablet terminals 130A and 130B, respectively. The tablet terminals 130A and 130B create digital signatures A and B, respectively.

In other words, the tablet terminal 130A enciphers the enciphered data DataB whose feature value B0 and hash value H0 are confirmed as being authentic and the feature value A0 of the signature image As of the party A, with the private key AX of the party A, and thus to create the digital signature A. The tablet terminal 130B creates the digital signature B in the same manner.

The tablet terminals 130A and 130B upload the digital signatures A and B onto the contract creation server 110, respectively. Upon receiving upload of the digital signatures A and B, the contract creation server 110 notifies the tablet terminals 130A and 130B of that digitally signing by the parties is complete (In FIG. 5, a digitally signing completion notification is sent only to the tablet terminal 130A).

The following describes the operations of the party A and the operations of the tablet terminal 130A. The same description applies to the operations of the party B and the operations of the tablet terminal 130B.

Upon receiving a digitally signing completion notification from the contract creation server 110, the tablet terminal 130A notifies the party A of that digitally signing is complete. Then, the party A requests the tablet terminal 130A to print the contract, the tablet terminal 130A downloads the signature images AS and BS, the contract body, and the digital signatures A and B from the contract creation server 110.

The tablet terminal 130A extracts the feature values A0 and B0 from the signature images AS and BS, respectively, calculates the hash value H0 of the contract body, and deciphers the digital signature B with the public key BY of the party B and thus to acquire the feature value B0 and the enciphered data DataA. Further, the tablet terminal 130A deciphers the enciphered data DataA with the public key AY of the party A and thus to acquire the feature value A0 and the hash value H0.

If the extracted feature values A0 and B0 and the calculated hash values H0 match the feature values A0 and B0 and the hash values H0 which are acquired by deciphering the enciphered data pieces DataA and Data B, respectively, the tablet terminal 130A creates QR code data C1 and C2 from the digital signatures A and B, respectively, and thus to create a contract image from the contract body, the signature images AS and BS, and the QR code data C1 and C2. The created contract image is for example such as shown in FIG. 2.

The tablet terminal 130A prints the created contract image by a printer such as an MFP (Multi-Function Peripheral) 501.

(4) Tablet Terminals 130A and 130B

Next, description is given on the structures and the operations of the tablet terminals 130A and 130B. Hereinafter, the tablet terminals 130A and 130B are collectively referred to as the tablet terminal 130.

(4-1) Hardware Structure

First, the hardware structure of the tablet terminal 130 is described.

Figure 6:
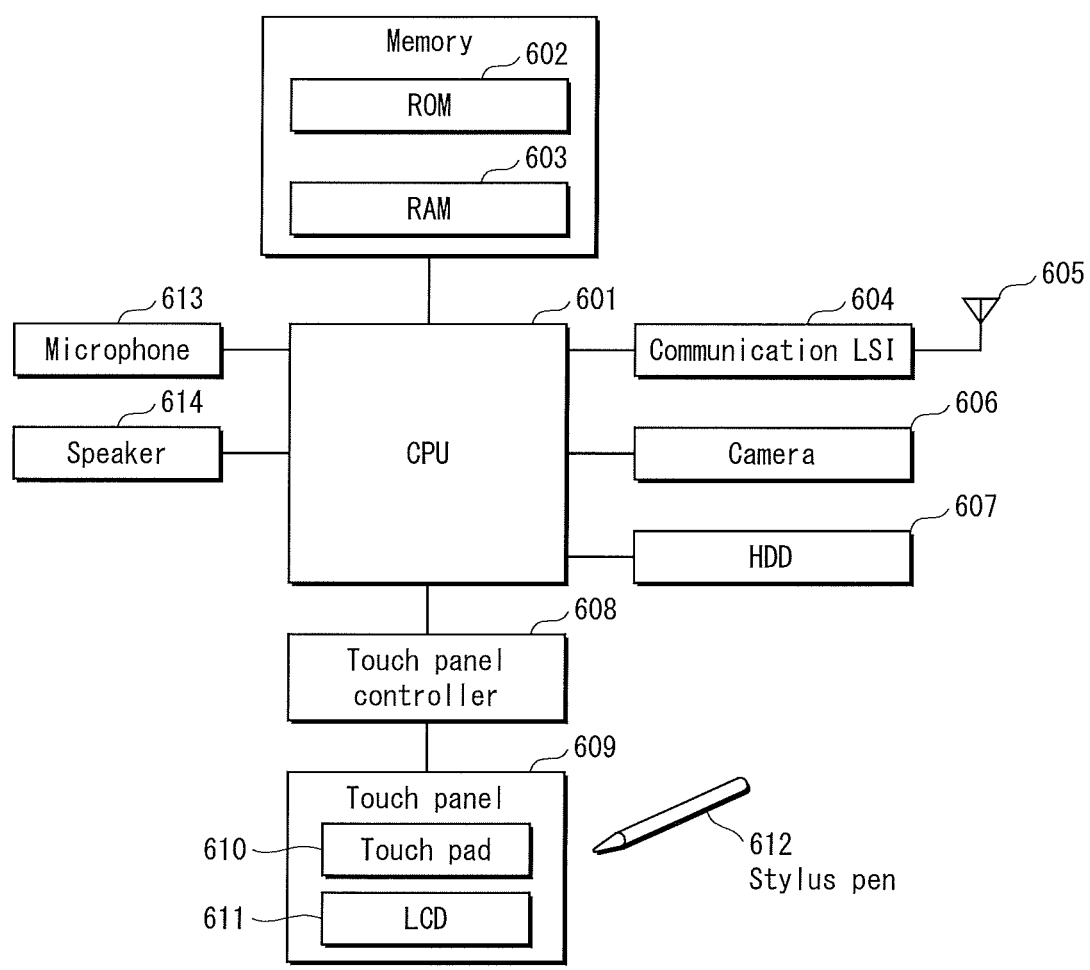
FIG. 6 is a block diagram showing the principal hardware structure of a tablet terminal 130.

As shown in FIG. 6, the tablet terminal 130 includes a CPU (Central Processing Unit) 601. When powered on, the CPU 601 reads a boot program from a ROM (Read Only Memory) 602 to start, reads an OS (Operating System), a contract creation program for terminal, and so on from an MD (Hard Disk Drive) 607, and executes them with use of a RAM (Random Access Memory) 603 as a storage region for work. The RAM 603 and the HDD 607 are used for storing the contract body, a signature image, and so on, which are described above.

A touch panel 609 has the structure in which a touch pad 610, which is an input device, is laid on an LCD (Liquid Crystal Display) 611, which is a display device. A touch panel controller 608 outputs the coordinates (x,y) of a contact position of a user's finger, a stylus pen 612, or the like, which is detected by a touch pad 610, to the CPU 601 for each predetermined time (for example 20 msec). This allows reception of input of handwritten signatures, the contract body, and so on.

Under control of the CPU 601, a communication LSI (Large Scale Integration) 604 connects to a communication network such as the Internet 120 via an antenna 605 to communicate with the contract creation server 110, the MFP 501, and so on.

A microphone 613 collects audio, and a speaker 614 outputs the audio. A camera 606 includes a CMOS (Complementary Metal Oxide Semiconductor) image sensor and a lens, and detects light entering the lens by the CMOS image sensor to create images.

(4-2) Functional Structure

Next, description is given on the functional structure of the tablet terminal 130.

Figure 7:
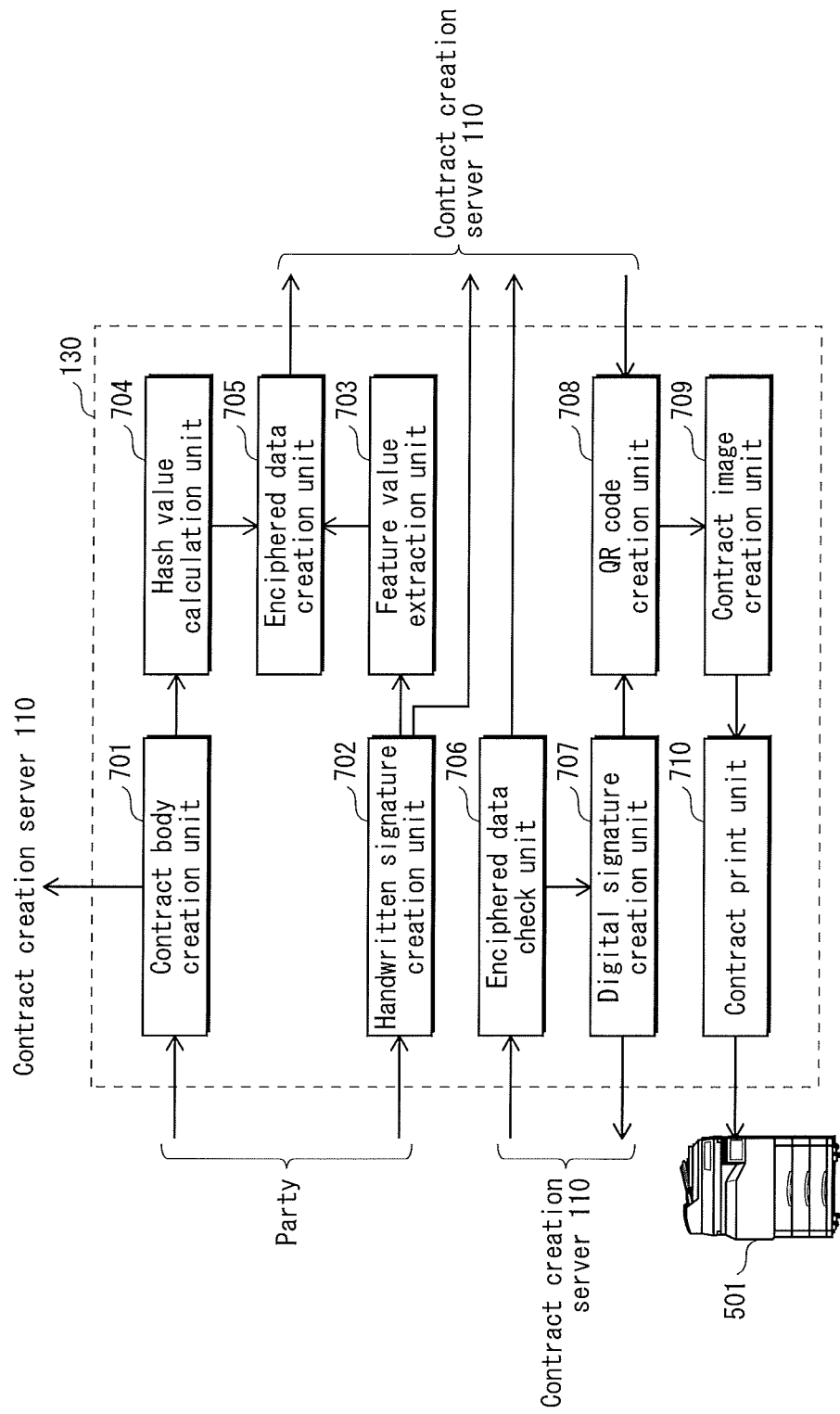
FIG. 7 is a block diagram showing the principal functional structure of the tablet terminal 130.

As shown in FIG. 7, the tablet terminal 130 includes a contract body creation unit 701, a handwritten signature creation unit 702, a feature value extraction unit 703, and so on.

In the body creation phase, the contract body creation unit 701 receives a user's operations made on the touch panel 609 to perform creation and revision of the contract body, registration in the contract creation server 110, reception of a registration notification from the contract creation server 110, download of the latest draft from the contract creation server 110, and so on. In the signature reception phase, the handwritten signature creation unit 702 receives a user's operation made on the touch panel 609 to create a signature image.

The feature value extraction unit 703 extracts a feature value from a signature image. A hash value calculation unit 704 downloads a text of the contract body from the contract creation server 110 to calculate a hash value. An enciphered data creation unit 705 enciphers the feature value of the signature image and the hash value of the contract body with a private key of one party to create enciphered data.

An enciphered data check unit 706 checks whether or not enciphered data created by the other party is authentic. A digital signature creation unit 707 enciphers the enciphered data created by the other party and a feature value of a signature image of the other party with a private key of the one the party, and thus to create a digital signature. A QR code creation unit 708 creates a QR code from the digital signature.

A contract image creation unit 709 creates a contract image. A contract print unit 710 prints the contract image.

(4-3) Operations

Next, description is given on the operations of the tablet terminal 130.

Figure 8:
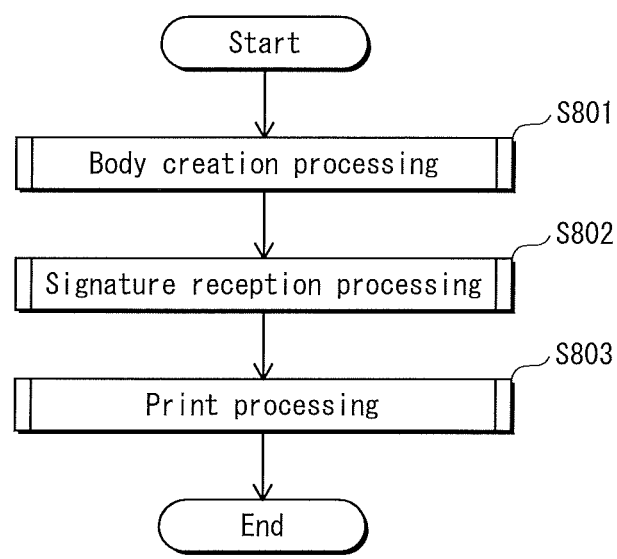
FIG. 8 is a flowchart showing operations of the tablet terminal 130.

As shown in FIG. 8, the tablet terminal 130 first performs body creation processing in the body creation phase (Step S801). After completing the body creation processing, the tablet terminal 130 performs signature reception processing in the signature reception phase (Step S802). After completing the signature reception processing, the tablet terminal 130 performs print processing in the print phase (Step S803), and then ends the operations.

(4-3-1) Body Creation Processing

Figure 9:
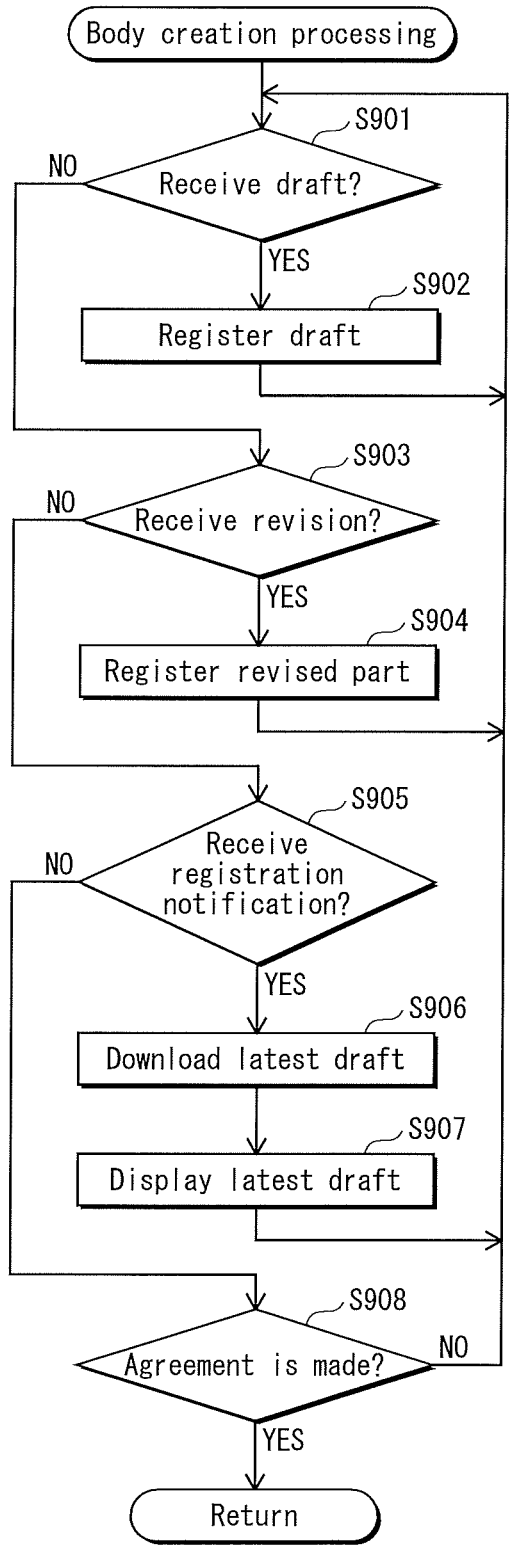
FIG. 9 is a flowchart showing body creation processing by the tablet terminal 130.

In the body creation processing, as shown in FIG. 9, upon receiving a draft of a contract from one party by the contract body creation unit 701 (Step S901: YES), the tablet terminal 130 registers the draft in the contract creation server 110 (Step S902). Upon receiving revision of the draft from the party (Step S903: YES), the tablet terminal 130 registers a revised part in the contract creation server 110 (Step S904).

Upon receiving a registration notification of the latest draft from the contract creation server 110 (Step S905: YES), the tablet terminal 130 downloads the latest draft from the contract creation server 110 (Step S906), and displays the latest draft on the LCD 611 (Step S907). Then, when parties agree to the latest draft (Step S908: YES), the tablet terminal 130 ends the processing and returns to the main routine.

(4-3-2) Signature Reception Processing

Figure 10:
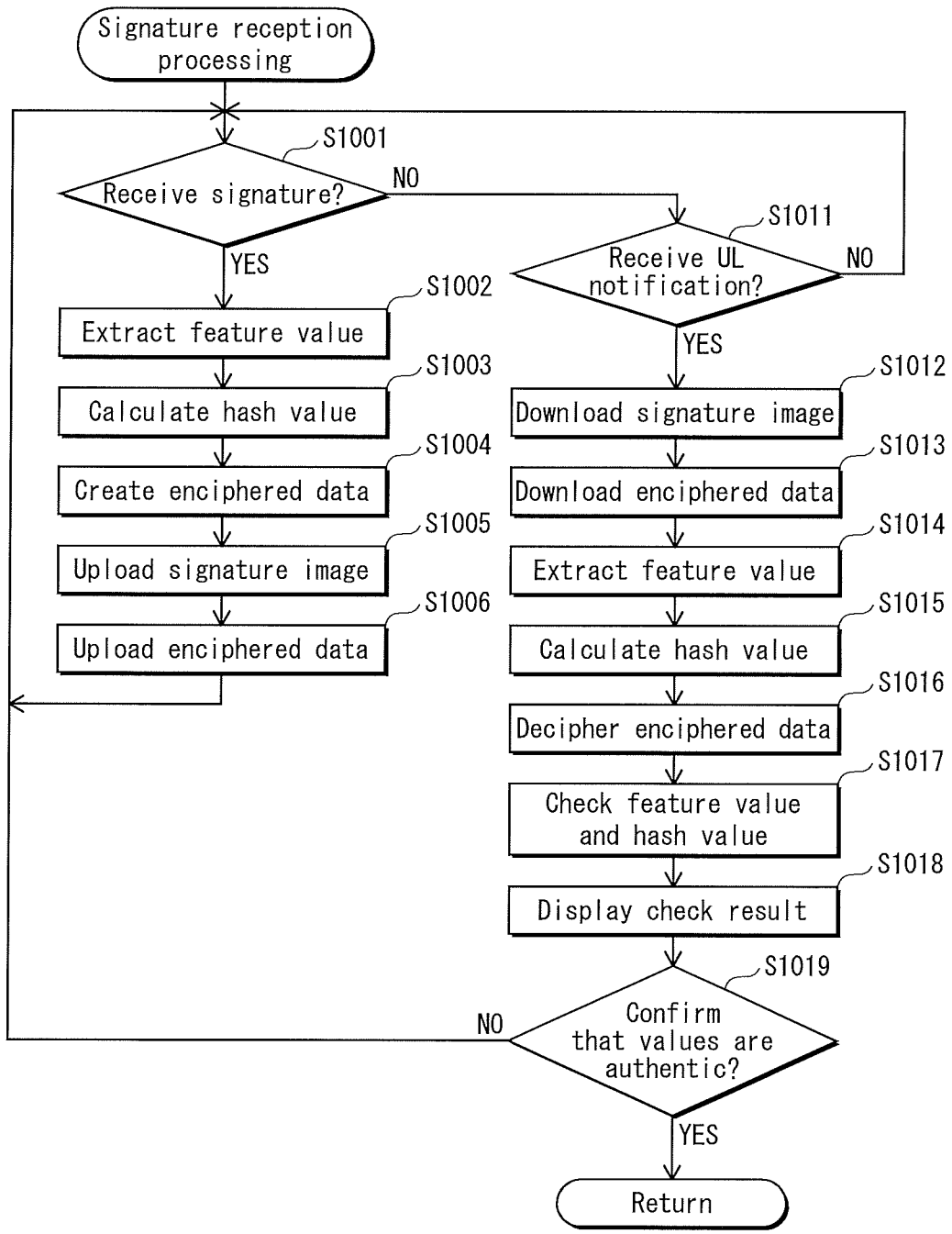
FIG. 10 is a flowchart showing signature reception processing by the tablet terminal 130.

In the signature reception processing of the tablet terminal 130, as shown in FIG. 10, the handwritten signature creation unit 702 receives a handwritten signature (Step S1001: YES), the feature value extraction unit 703 extracts a feature value from a signature image of the handwritten signature (Step S1002), and the hash value calculation unit 704 calculates a hash value of a contract body (Step S1003). The enciphered data creation unit 705 creates enciphered data by enciphering the feature value and the hash value with a private key of the one party (Step S1004).

Then, the handwritten signature creation unit 702 uploads the signature image onto the contract creation server 110 (Step S1005), and the enciphered data creation unit 705 uploads the enciphered data onto the contract creation server 110 (Step S1006). Then, the flow returns to Step S1001.

Upon receiving an UL notification from the contract creation server 110 by the enciphered data check unit 706 (Step S1011: YES), the tablet terminal 130 downloads the signature image and the enciphered data relating to the UL notification from the contract creation server 110 (Steps S1012 and S1013), extracts a feature value from the signature image (Step S1014), and downloads the contract from the contract creation server 110 and calculates a hash value of the contract body if having not yet calculated it (Step S1015).

Further, the tablet terminal 130 deciphers the enciphered data with a public key of the other party (Step S1016), checks whether or not the extracted feature value and the calculated hash value match a feature value and a hash value, which are acquired by deciphering the enciphered data, respectively (Step S1017) and displays a check result on the LCD 611 (Step S1018). Then, if confirming that the feature value and the hash value are authentic (Step S1019: YES), the tablet terminal 130 ends the processing and returns to the main routine.

If the check result shows that the feature values do not mach each other and/or the hash values do not match each other, subsequent processing is prohibited and a contract image is not created.

(4-3-3) Print Processing

Figure 11:
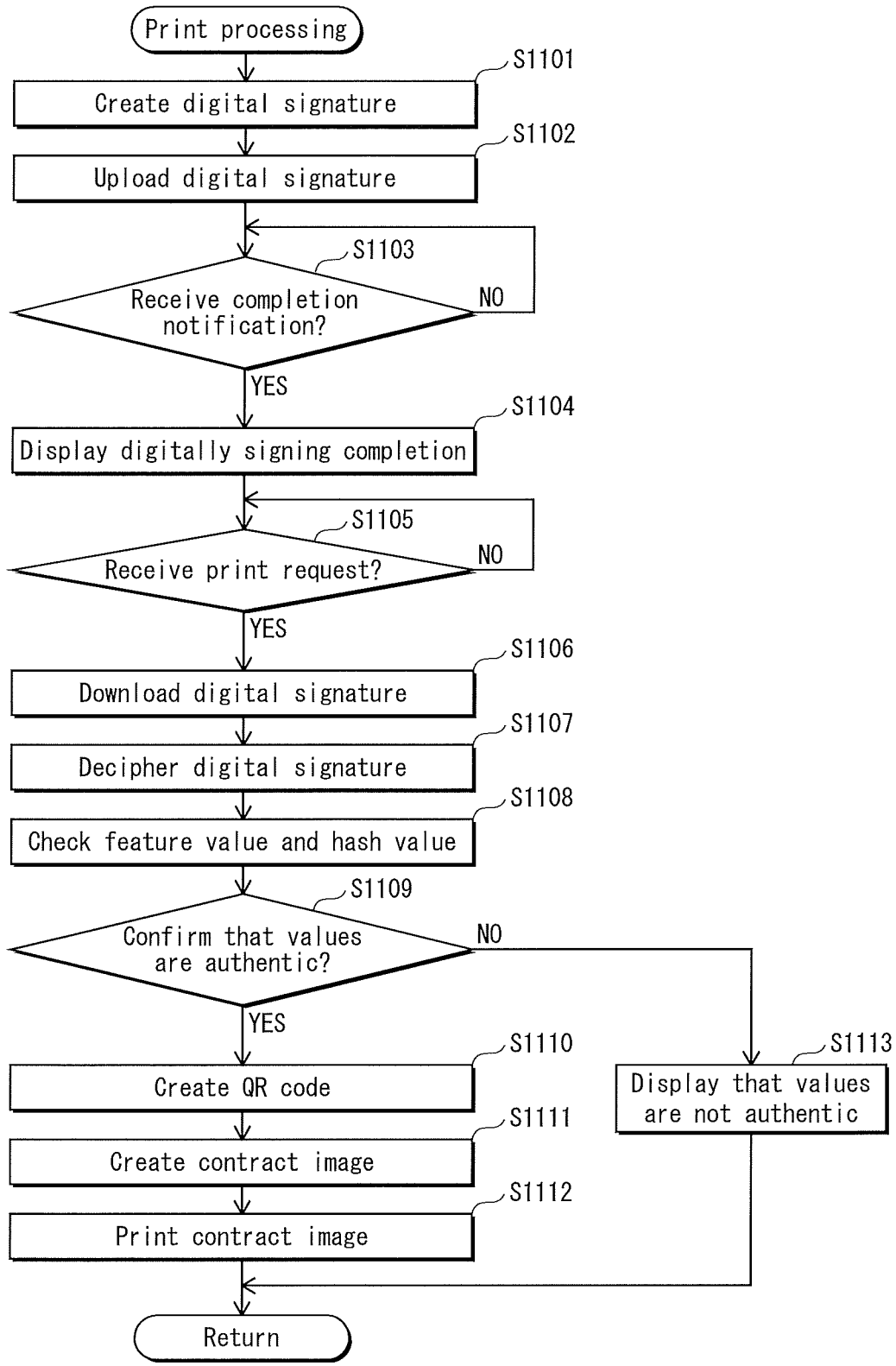
FIG. 11 is a flowchart showing print processing by the tablet terminal 130.

In the print processing, as shown in FIG. 11, the tablet terminal 130 creates a digital signature by the digital signature creation unit 706 (Step S1101), and uploads the digital signature onto the contract creation server 110 (Step S1102).

Upon receiving a digitally signing completion notification from the contract creation server 110 (Step S1103: YES), the tablet terminal 130 displays a message indicating that digitally signing is complete on the LCD 611 (Step S1104).

Further, upon receiving a request to print the contract from the one party (Step S1105: YES), the tablet terminal 130 downloads a digital signature of the other party from the contract creation server 110 by the QR code creation unit 708 (Step S1106), and deciphers the digital signature with a public key of the other party and thus to acquire a feature value and a hash value (Step S1107). The tablet terminal 130 checks whether or not the acquired feature value and hash value are authentic (Step S1108). If the acquired feature value and hash value are not authentic (Step S1109: NO), the tablet terminal 130 displays a message indicating that the acquired feature value and hash value are not authentic on the LCD 611 (Step S1113), and ends the processing. Therefore, subsequent processing is prohibited.

If the acquired feature value and hash value are confirmed as being authentic (Step S1109: YES), the QR code creation unit 708 creates a QR code from each of the respective digital signatures of the parties (Step S1110), and the contract image creation unit 709 creates a contract image from the contract body, the signature images, and the QR codes (Step S1111). The contract print unit 710 sends the contract image to the MFP 501, and the contract image is printed (Step S1112).

The printed contract has the contract body, the signature images, and the QR codes that are disposed in respective predetermined columns, as shown in FIG. 2 for example.

(5) Contract Creation Server 110

Next, description is given on the structure and the operations of the contract creation server 110.

(5-1) Hardware Structure

First, the hardware structure of the contract creation server 110 is described.

Figure 12:
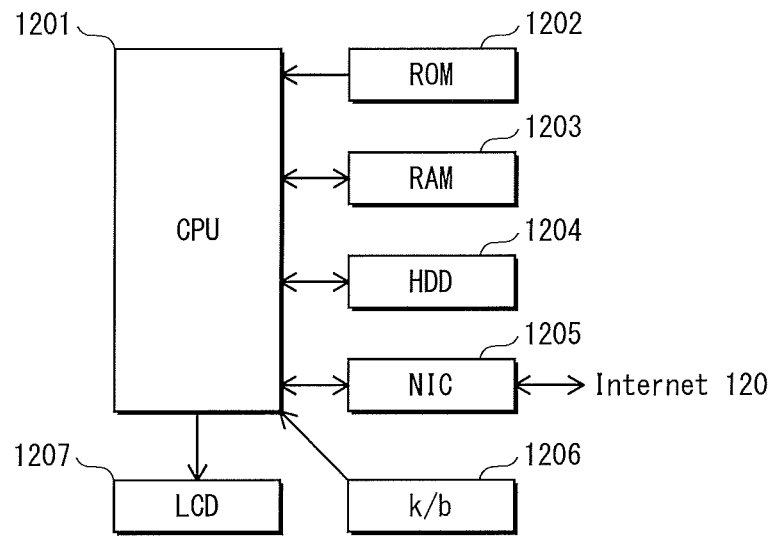
FIG. 12 is a block diagram showing the principal hardware structure of a contract creation server 110.

As shown in FIG. 12, the contract creation server 110 includes a CPU 1201. When powered on, the CPU 1201 reads a boot program from a ROM 1202 to start, reads an OS, a contract creation program for server, and so on from an HDD 1204, and executes them with use of a RAM 1203 as a storage region for work.

Also, an NIC (Network Interface Card) 1205 is connected to the CPU 1201, and the CPU 1201 controls the NIC 1205 so as to communicate with the tablet terminals 130A and 130B, and so on via the Internet 120. Further, a keyboard 1206 and an LCD 1207 are connected to the CPU 1201. The keyboard 1206 receives input of an administrator's operations, and the LCD 1207 displays information.

(5-2) Functional Structure

Next, description is given on the functional structure of the contract creation server 110.

Figure 13:
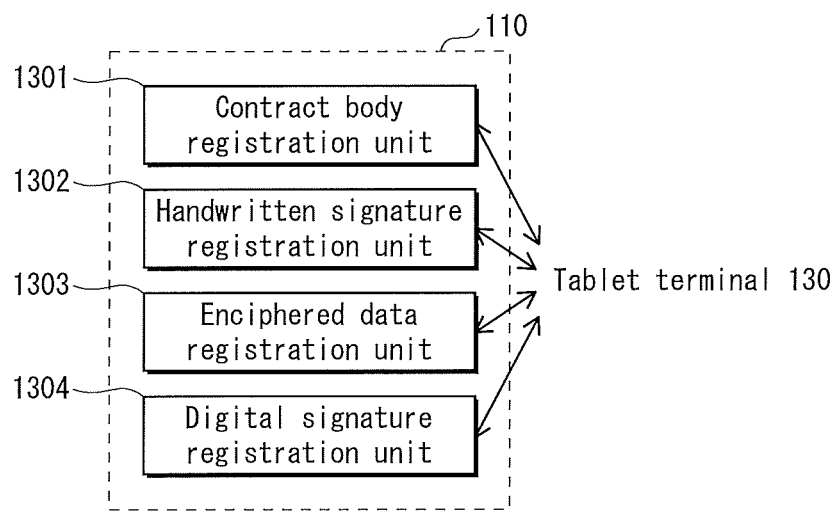
FIG. 13 is a block diagram showing the principal functional structure of the contract creation server 110.

As shown in FIG. 13, the contract creation server 110 includes a contract body registration unit 1301, a handwritten signature registration unit 1302, an enciphered data registration unit 1303, and so on.

The contract body registration unit 1301 receives registration of a contract body and a revised part from the tablet terminal 130 and stores therein them, and notifies the tablet terminal 130 of registration of the contract body and the revised part. Further, the contract body registration unit 1301 sends the latest draft in response to a download request from the tablet terminal 130.

The handwritten signature registration unit 1302 stores therein a signature image uploaded by the tablet terminal 130, and also sends a signature image in response to a download request from the tablet terminal 130.

The enciphered data registration unit 1303 stores therein enciphered data uploaded by the tablet terminal 130, and also sends enciphered data in response to a download request from the tablet terminal 130.

The digital signature registration unit 1304 stores therein a digital signature uploaded by the tablet terminal 130. When upload of all digital signatures relating to a contract is complete, the digital signature registration unit 1304 sends a digitally signing completion notification to each tablet terminal 130. Further, the digital signature registration unit 1304 sends a digital signature in response to a download request from the tablet terminal 130.

(5-3) Operations

Next, description is given on the operations of the contract creation server 110.

Figure 14:
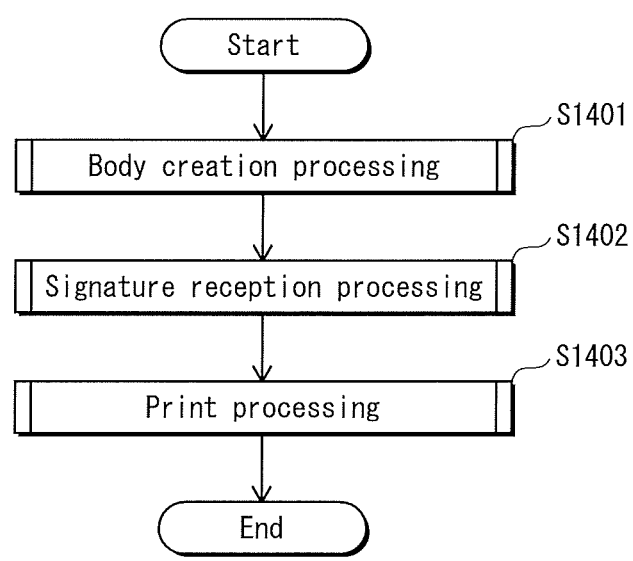
FIG. 14 is a flowchart showing operations of the contract creation server 110.

As shown in FIG. 14, the contract creation server 110 first performs body creation processing in the body creation phase (Step S1401). After completing the body creation processing, the contract creation server 110 performs signature reception processing in the signature reception phase (Step S1402). After completing the signature reception processing, the contract creation server 110 performs print processing in the print phase (Step S1403), and then ends the operations.

(5-3-1) Body Creation Processing

Figure 15:
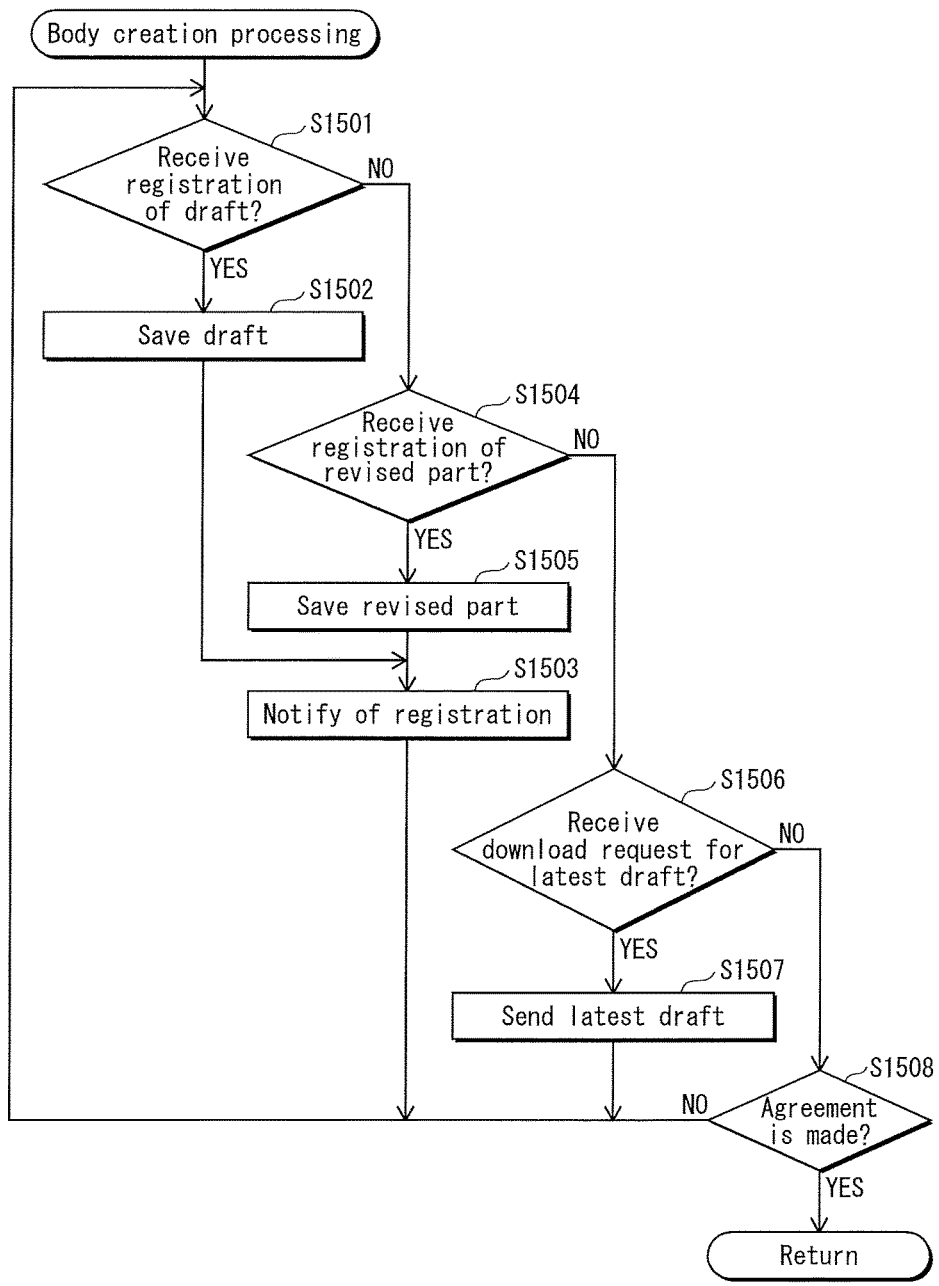
FIG. 15 is a flowchart showing body creation processing by the contract creation server 110.

In the body creation processing, as shown in FIG. 15, upon receiving registration of a draft of a contract from one party by the contract body registration unit 701 (Step S1501: YES), the contract creation server 110 saves the draft of the contract (Step S1502), and sends a notification indicating registration of the draft of the contract to the tablet terminal 130 of the other party (Step S1503).

When receiving registration of only a revised part of the draft of the contract (S1504: YES), the contract creation server 110 saves the revised part (Step S1505), and sends a notification indicating registration of the revised part to the tablet terminal 130 of the other party (Step S1503).

Upon receiving a download request for the latest draft from any tablet terminals 130 (Step S1506: YES), the contract creation server 110 sends the latest draft to the tablet terminal 130 that has requested the latest draft (Step S1507). Then, when the parties agree to the latest draft (Step S1508: YES), the contract creation server 110 ends the processing and returns to the main routine.

(5-3-2) Signature Reception Processing

Figure 16:
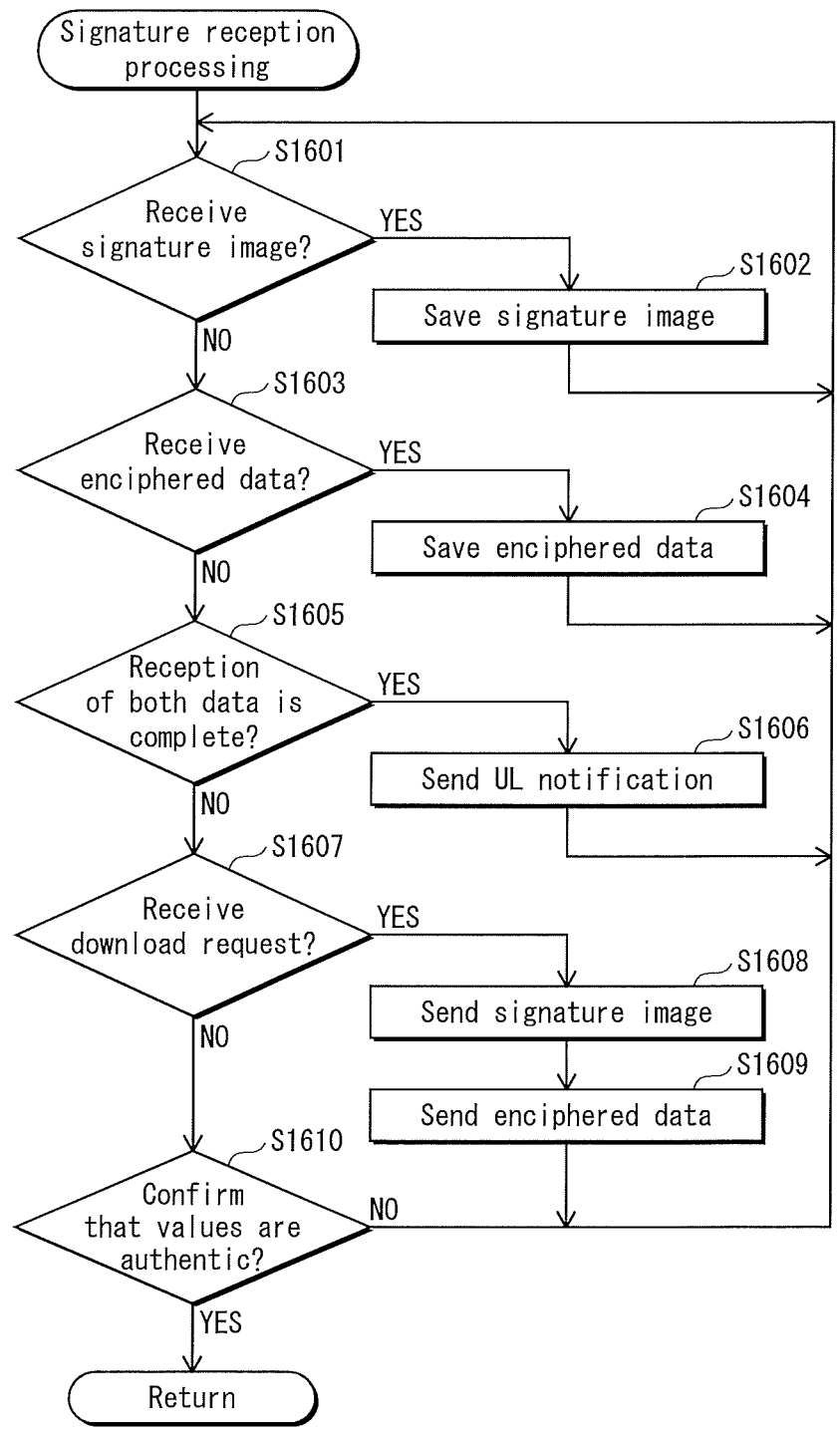
FIG. 16 is a flowchart showing signature reception processing by the contract creation server 110.

In the signature reception processing, as shown in FIG. 16, upon receiving a signature image from the tablet terminal 130 of the one party (Step S1601: YES), the contract creation server 110 saves the signature image by the handwritten signature registration unit 1302 (Step S1602). Also, upon receiving enciphered data from the tablet terminal 130 of the one party (Step S1603: YES), the contract creation server 110 saves the enciphered data by the enciphered data registration unit 1303 (Step S1604).

When save of the signature image and the enciphered data is complete (Step S1605: YES), the contract creation server 110 sends an UL notification to the tablet terminal 130 of the other party (Step S1606).

Also, in response to a download request from the tablet terminal 130 of the other party (Step S1607: YES), the handwritten signature registration unit 1302 returns the signature image to the tablet terminal 130 of the other party (Step S1608), and the enciphered data registration unit 1303 returns the enciphered data to the tablet terminal 130 of the other party (Step S1609).

Then, when the other party confirms that a feature value and a hash value, which are acquired by deciphering the enciphered data, are authentic (Step S1610: YES), the contract creation server 110 ends the processing and returns to the main routine. When receiving a completion notification from both the tablet terminals 130 for example, the contract creation server 110 determines that the parties each have confirmed that the feature value and the hash value are authentic.

(5-3-3) Print Processing

Figure 17:
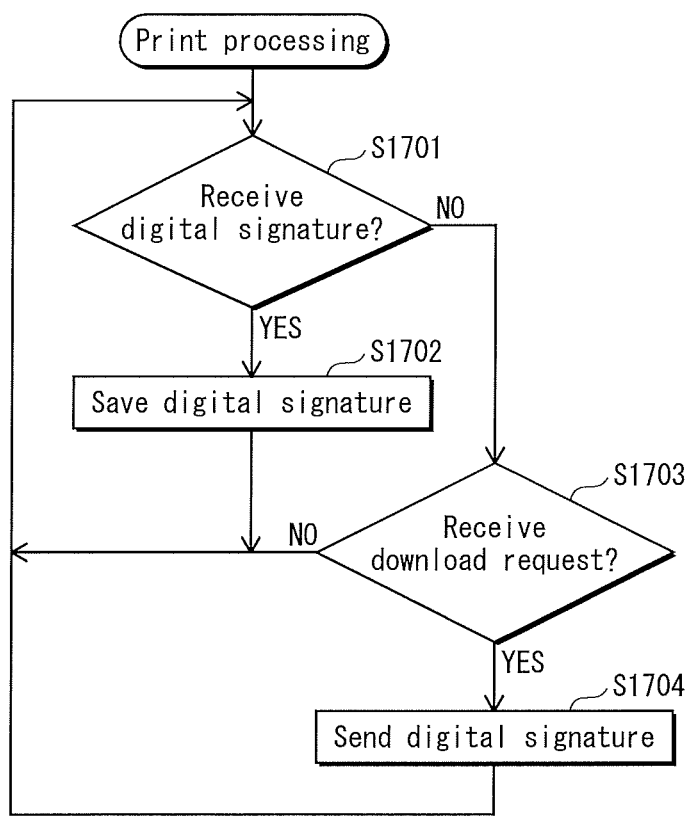
FIG. 17 is a flowchart showing print processing by the contract creation server 110.

In the print processing, as shown in FIG. 17, upon receiving a digital signature from the tablet terminal 130 (Step S1701: YES), the contract creation server 110 saves the digital signature by the digital signature registration unit 1304 (Step S1702). Also, upon receiving a download request for a digital signature from the tablet terminal 130 (Step S1703: YES), the contract creation server 110 sends the digital signature to the tablet terminal 130 (Step S1704).

(6) Verification of Contract

Next, description is given on a procedure for verifying a contract created as described above.

(6-1) Functional Structure

First, description is given on the functional structure of the tablet terminal 130 for contract verification.

Figure 18:
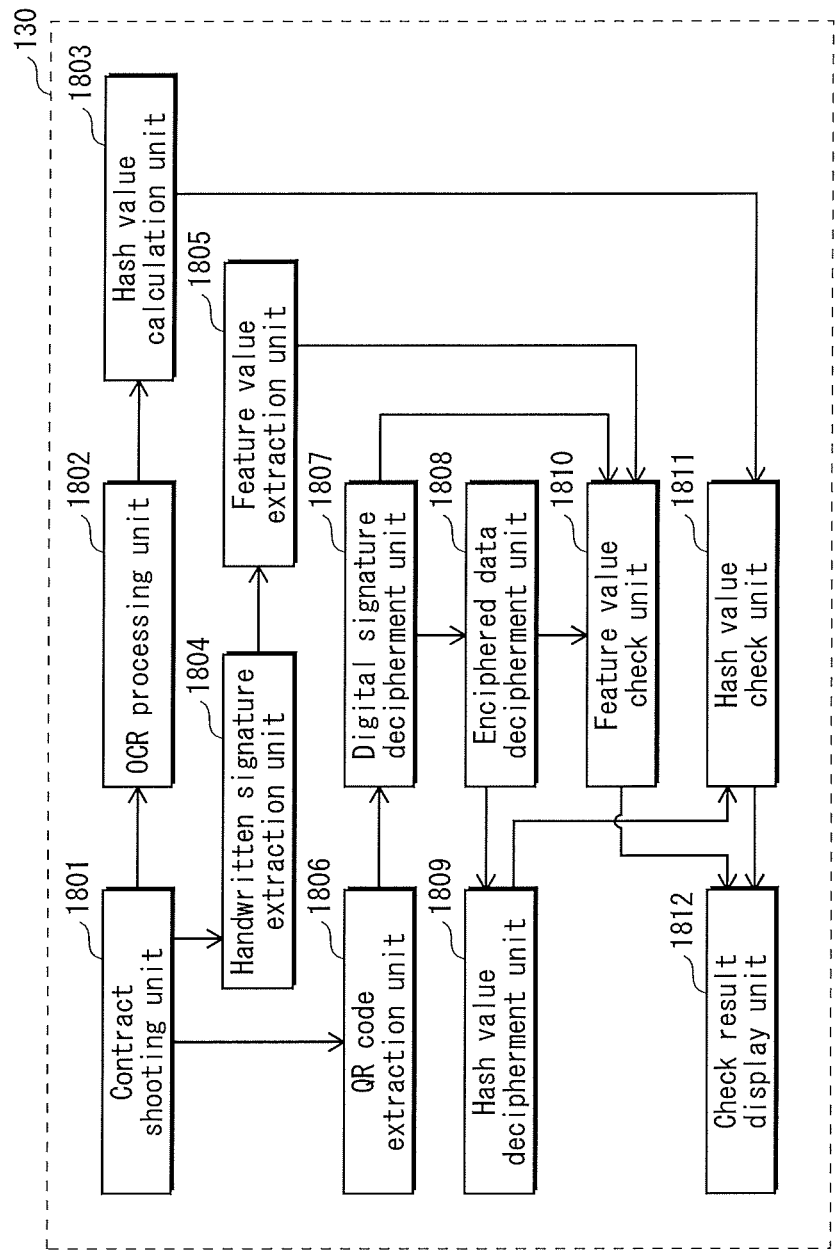
FIG. 18 is a block diagram showing the functional structure for contract verification processing of the tablet terminal 130.

As shown in FIG. 18, the tablet terminal 130 includes a contract shooting unit 1801, an OCR (Optical Character Recognition) processing unit 1802, a hash value calculation unit 1803, and so on.

The contract shooting unit 1801 controls the camera 606 to shoot a contract to be verified, and thus to create a document image (image). The OCR processing unit 1802 creates a text from the document image by character recognition. The hash value calculation unit 1803 calculates a hash value H0 (a first hash value) of the text.

A handwritten signature extraction unit 1804 extracts a signature image from the document image. A feature value extraction unit 1805 extracts a feature value (a first feature value) from the signature image. A QR code extraction unit 1806 extracts a QR code from the document image. A digital signature decipherment unit 1807 deciphers the QR code and thus to acquire a digital signature.

An enciphered data decipherment unit 1808 deciphers the digital signature with a public key of a party and thus to acquire enciphered data and a feature value (a second feature value). A hash value decipherment unit 1809 deciphers the enciphered data with the public key of the party and thus to acquire a hash value (a second hash value) and a feature value (a third feature value).

Description is given taking as an example the case where the contract exemplified in FIG. 2 is verified. The first feature values A0 and B0 are extracted from the respective signature images AS and BS, respectively, which have been created by extracting the handwritten signatures 210A and 201B, respectively.

Also, the second feature value A0 is acquired by deciphering the digital signature A, which is acquired by deciphering the QR code 220A, with the public key AY. Similarly, the second feature value B0 is acquired from the QR code 220B.

Further, the enciphered data pieces DataA and DataB are also acquired by deciphering the QR codes 220A and 220B, respectively. The third feature values A0 and B0 are acquired by deciphering the enciphered data pieces DataA and DataB with the public keys AY and BY, respectively.

The respective second hash values H0 are also acquired by deciphering the enciphered data pieces DataA and DataB.

A feature value check unit 1810 compares the first feature value, the second feature value, and the third feature value to check whether or not these feature values match one another. A hash value check unit 1811 compares the first hash values and the second hash value to check whether or not these hash values match each other. If the feature values do not match one another, a check result display unit 1812 displays a message indicating that the handwritten signature has been tampered with. If the hash values do not match each other, the check result display unit 1812 displays a message indicating that the contract body has been tampered with. If the feature values match each other and the hash values match each other, the check result display unit 1812 displays a message indicating that authenticity of the content of the contract is confirmed.

(6-2) Verification Operation

Next, description is given on contract verification operations.

Figure 19:
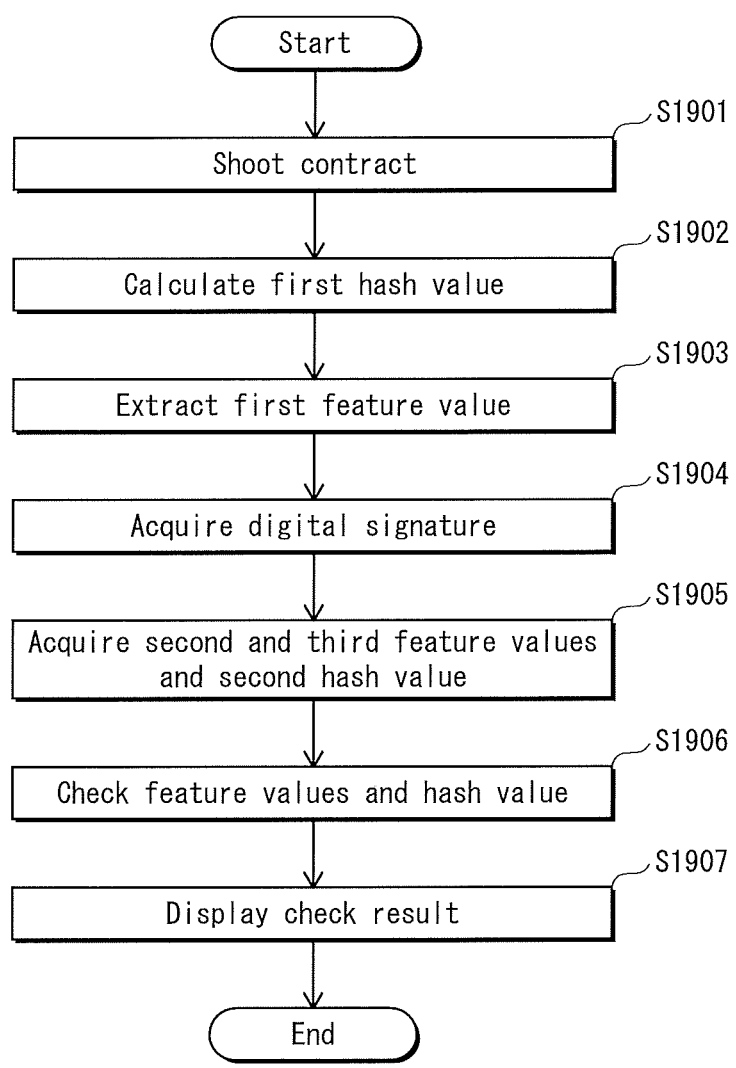
FIG. 19 is a flowchart showing contract verification processing by the tablet terminal 130.

As shown in FIG. 19, the contract shooting unit 1801 controls the cameral 606 to shoot the contract to create a document image (Step S1901). Next, the OCR processing unit 1802 creates a text of the contract body from the document image, and the hash value calculation unit 1803 calculates the first hash value H0 of the text (Step S1902).

Also, the handwritten signature extraction unit 1804 extracts the respective handwritten signatures of the parties A and B from the document image, and the feature value extraction unit 1805 extracts first feature values A0 and B0 (Step S1903). The QR code extraction unit 1806 extracts QR codes 220A and 220B from the document image, and the digital signature decipherment unit 1807 deciphers the QR codes 220A and 220B, and thus to acquire the digital signatures A and B, respectively (Step S1904).

Next, the enciphered data decipherment unit 1808 deciphers the digital signatures A and B with the public keys AY and BY, respectively, and thus to acquire the enciphered data pieces DataA and DataB and the second feature values A0 and B0, respectively. Further, the hash value decipherment unit 1809 deciphers the enciphered data pieces DataA and DataB with the public keys AY and BY, respectively and thus to acquire the third feature values A0 and B0 and the second hash values H0, respectively (Step S1905).

Then, the feature value check unit 1810 compares the first, second, third feature values A0 and B0 to check whether or not these feature values match one another, and the hash value check unit 1811 compares the first and second hash values to check whether or not these hash values match each other (Step S1906).

By checking whether or not the first, second, third feature values match one another, it is possible to check whether or not the respective handwritten signatures of the parties A and B, who have agreed to the contract body, have been tampered with after signing by the parties A and B. Also, by checking whether or not the first and second hash values match each other, it is possible to check whether or not the contract body to which the parties A and B agreed and signed matches the shot contract body.

Then, the check result display unit 1812 displays check results on the LCD 611 (Step S1907).

[2] Second Embodiment

Next, a second embodiment of the present invention is described. A contract creation system relating to the present embodiment has basically the same structure as the contract creation system 1 relating to the above first embodiment, but differs from the contract creation system 1 in terms of creating a contract between three or more parties. The following description focuses on this difference.

Common reference numerals are appended to compositional elements that are common between the first and second embodiments.

Figure 20A:
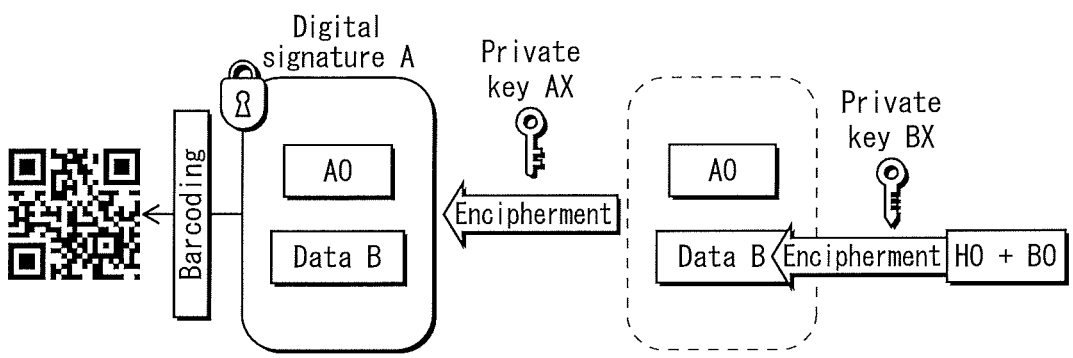
FIG. 20A describes a method of creating a digital signature A of a party A in the first embodiment.

In the above first embodiment, a digital signature of each party is created by encrypting a feature value of the signature image of the party and enciphered data of the other party with a private key of the party. For example as shown in FIG. 20A, the digital signature A of the party A is created by encrypting the feature value A0 of the signature image AS of the party A and the enciphered data DataB with the private key AX of the party A. The enciphered data DataB is acquired by enciphering the hash value H0 of the text of the contract body and the feature value B0 of the signature image BS of the party B with the private key BX of the party B.

Figure 20B:
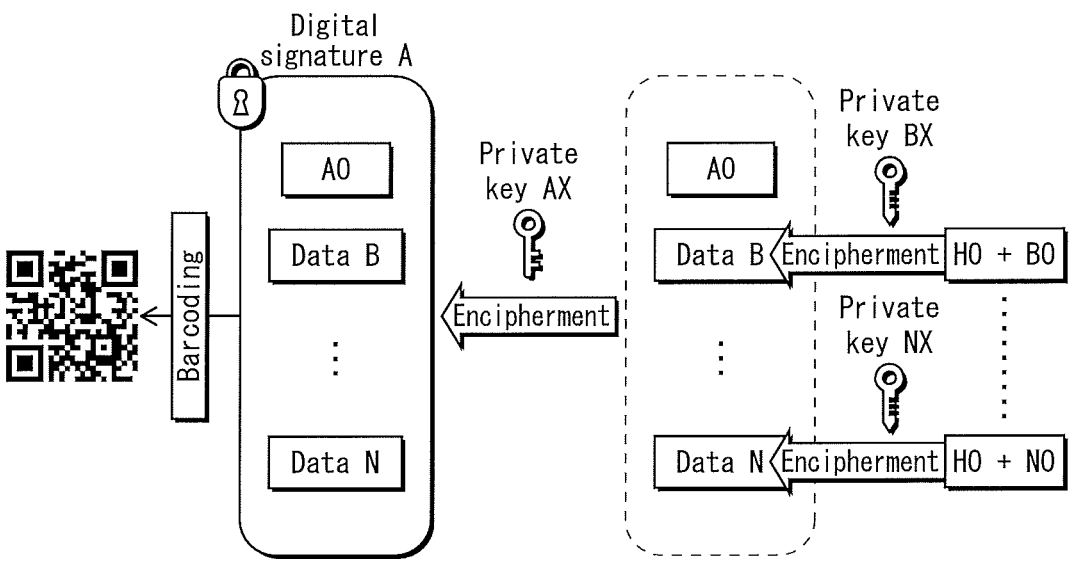
FIG. 20B describes a method of creating the digital signature A of the party A in a second embodiment of the present invention.

In the present embodiment compared with this, a digital signature of each party is created by encrypting a feature value of the signature image of the party and enciphered data of each of the other parties with a private key of the party. A QR code is created from the digital signature. For example as shown in FIG. 20B, the digital signature A of the party A is created by encrypting the feature value A0 of the signature image AS of the party A and enciphered data DataB to DataN with the private key AX of the party A. The enciphered data DataB to DataN are each acquired by enciphering the hash value H0 of the text of the contract body and a corresponding one of feature values B0 to N0 of signature images BS to NS of the parties B to N with respective private keys BX to NX of the parties B to N.

The QR code, which is created from the digital signature A, guarantees that all the parties have agreed to the contract body indicated by the text having the hash value H0 included in the enciphered data and signed the contract in handwriting. Therefore, the contract resulting from printing the contract image which includes the QR codes constitutes evidence of the contract content.

[3] Third Embodiment

Next, a third embodiment of the present invention is described. A contract creation system relating to the present embodiment has basically the same structure as the contract creation system 1 relating to the above first embodiment, but differs from the contract creation system 1 in that part of processing is performed by the contract creation server 110 using its unique private key SX, instead of the tablet terminal 130. The following description focuses on this difference.

(1) Contract Creation Procedure

First, the contract creation procedure is described. A body creation phase is the same as that in the above embodiments, and accordingly description thereof is omitted.

Figure 21:
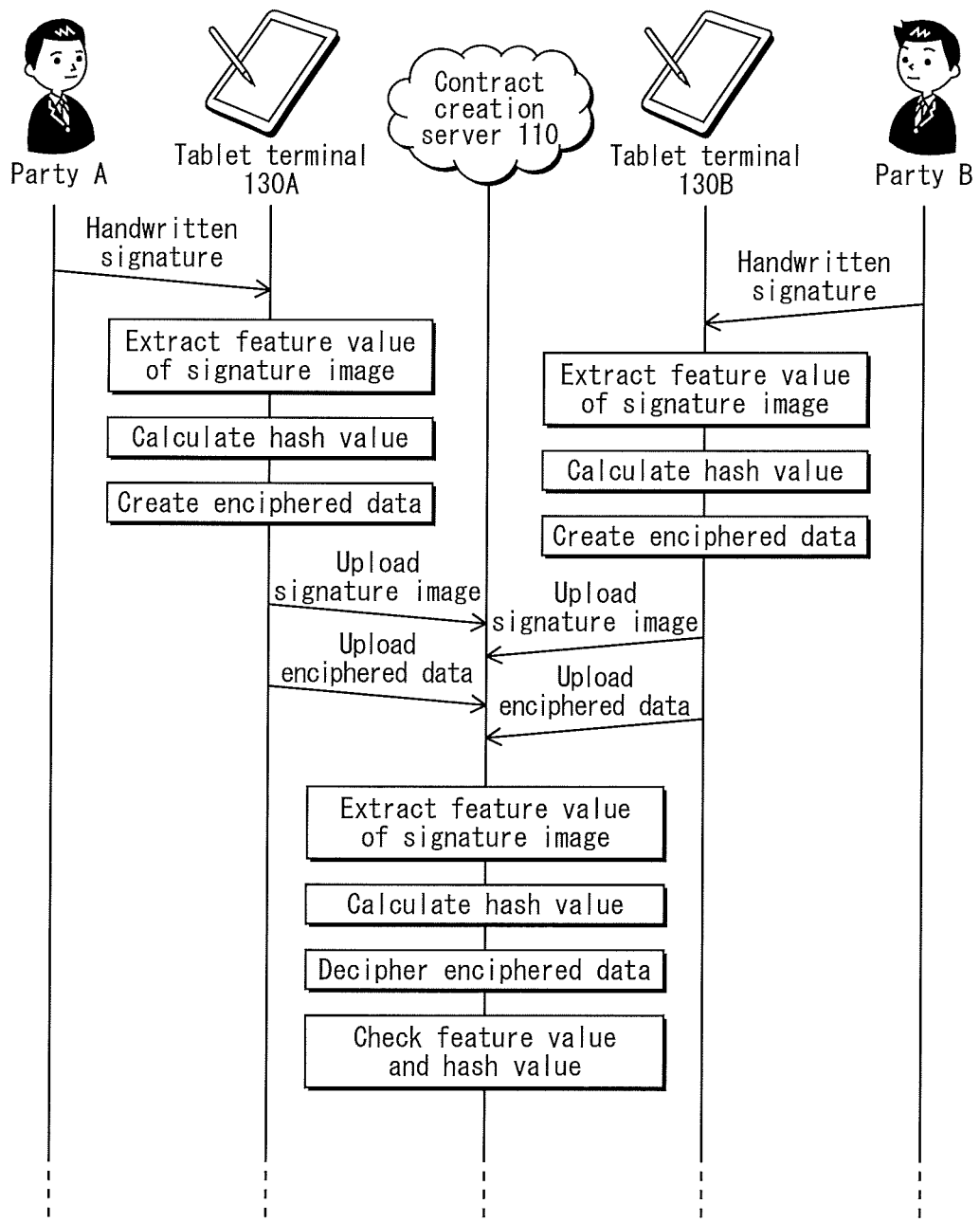
FIG. 21 is a sequence diagram describing a phase in a contract creation procedure in a third embodiment of the present invention that corresponds to the signature reception phase.

After completing the body creation phase, as shown in FIG. 21, the parties A and B signs in handwriting, and the signature images AS and BS and the enciphered data pieces DataA and DataB are uploaded onto the contract creation server 110.

Upon receiving upload of the signature images AS and BS and the enciphered data pieces DataA and DataA, the contract creation server 110 extracts the feature values A0 and B0 from the signature images AS and BS, respectively, and calculates the hash value H0 from the contract body, and deciphers the enciphered data pieces DataA and DataB with the public keys AY and BY of the parties A and B, respectively.

Then, the contract creation server 110 checks whether or not the feature values A0 and B0 extracted from the signature images AS and BS, respectively and the hash value H0 calculated from the contract body match the feature values A0 and B0 and the hash values H0 which are acquired by deciphering the enciphered data pieces DataA and DataB, respectively.

Figure 22:
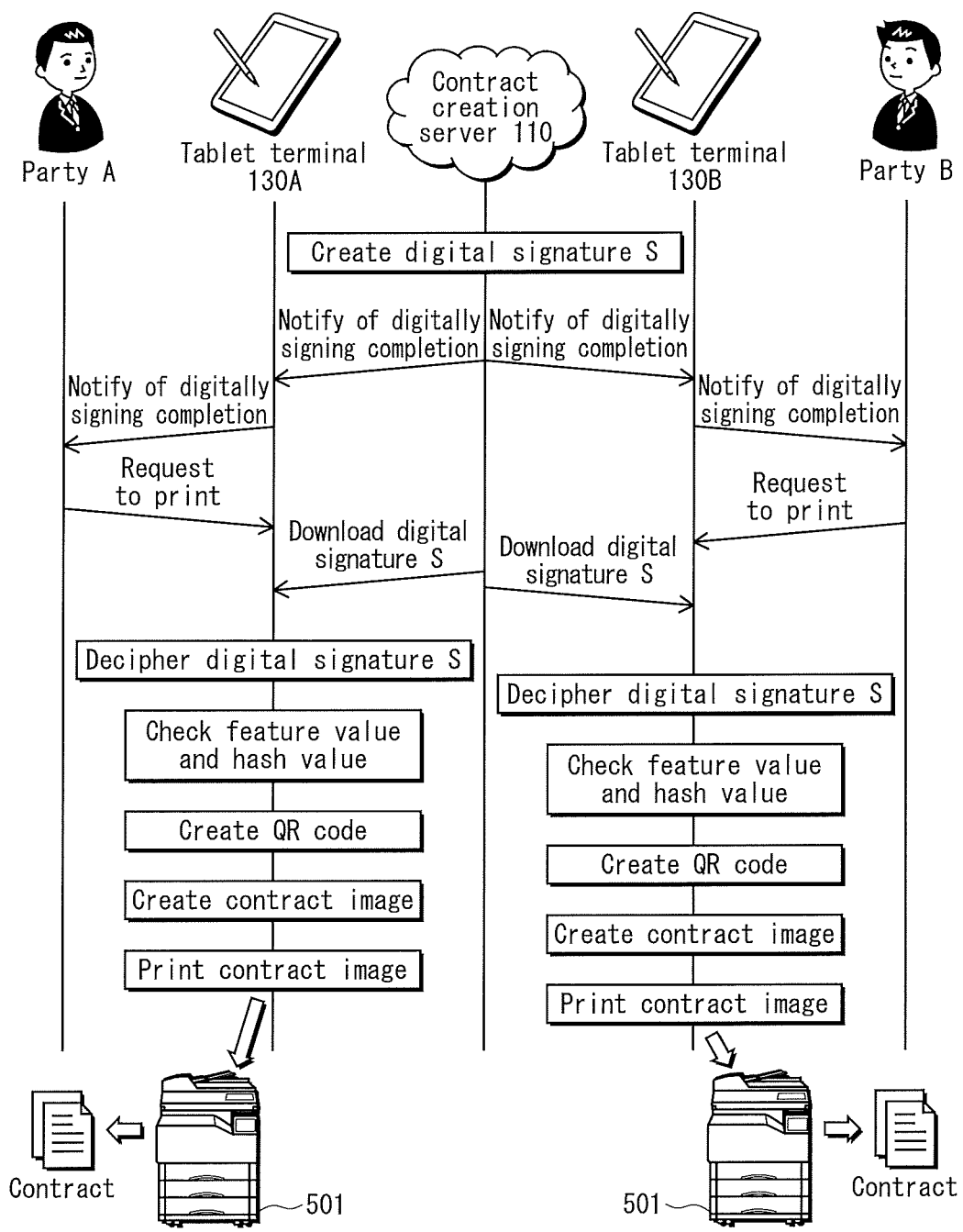
FIG. 22 is a sequence diagram describing a phase in the contract creation procedure in the third embodiment that corresponds to the print phase.

After confirming that these feature values match each other and the hash values match each other, the contract creation server 110 enciphers the enciphered data pieces DataA and DataB with its own private key SX and thus to create a digital signature S, and sends a digitally signing completion notification to the tablet terminals 130A and 130B, as shown in FIG. 22. Upon receiving the digitally signing completion notification, the tablet terminals 130A and 130B display a message indicating completion of digitally signing to the parties A and B, respectively.

Upon receiving the message indicating completion of digitally signing, the parties A and B each print the contract image in the same manner as in the above embodiments. For example, when the party A requests the tablet terminal 130A to print the contract image, the tablet terminal 130A downloads the signature images AS and BS, the contract body, and the digital signature S from the contract creation server 110.

Then, the tablet terminal 130A extracts the feature values A0 and B0 from the signature images AS and BS, respectively, calculates the hash value H0 of the contract body, and deciphers the digital signature S with a public key SY of the contract creation server 110 and the respective public keys AY and BY of the parties A and B, and thus to acquire the feature values A0 and B0 and the enciphered data pieces DataA and DataB. Further, the tablet terminal 130A deciphers the enciphered data pieces DataA and DataB with the respective public keys AY and BY of the parties A and B, respectively, and thus to acquire the feature values A0 and B0 and the hash values H0, respectively.

If the extracted feature values A0 and B0 and the calculated hash value H0 match the deciphered feature values A0 and B0 and the hash values H0, which are acquired by deciphering the enciphered data pieces DataA and DataB, respectively, the tablet terminal 130A creates QR code data C3 from the digital signature S, and creates a contract image with use of the contract body, the signature images AS and BS, and the QR code data C3.

The created contract image is for example such as shown in FIG. 23. In the contract image, a QR code 220C corresponding to the QR code data C3 is disposed near handwritten signatures. After crating the contract image, the tablet terminal 130A prints the contract image by a printer such as the MFP 501.

The QR code 220C is created by encrypting the enciphered data pieces DataA and DataB with the private key SX of the contract creation server 110. The enciphered data DataA is creatable only by the party A encrypting the hash value H0 of the contract body and the feature value A0 of the signature image AS with the private key AX. The enciphered data DataB is creatable only by the party B encrypting the hash value H0 of the contract body and the feature value B0 of the signature image BS with the private key BX, Therefore, the QR code 220C guarantees that the parties A and B have signed the contract in agreement to the contract body.

(2) Operations of Contract Creation Server 110

Next, description is given on the operations of the contract creation server 110.

Figure 24:
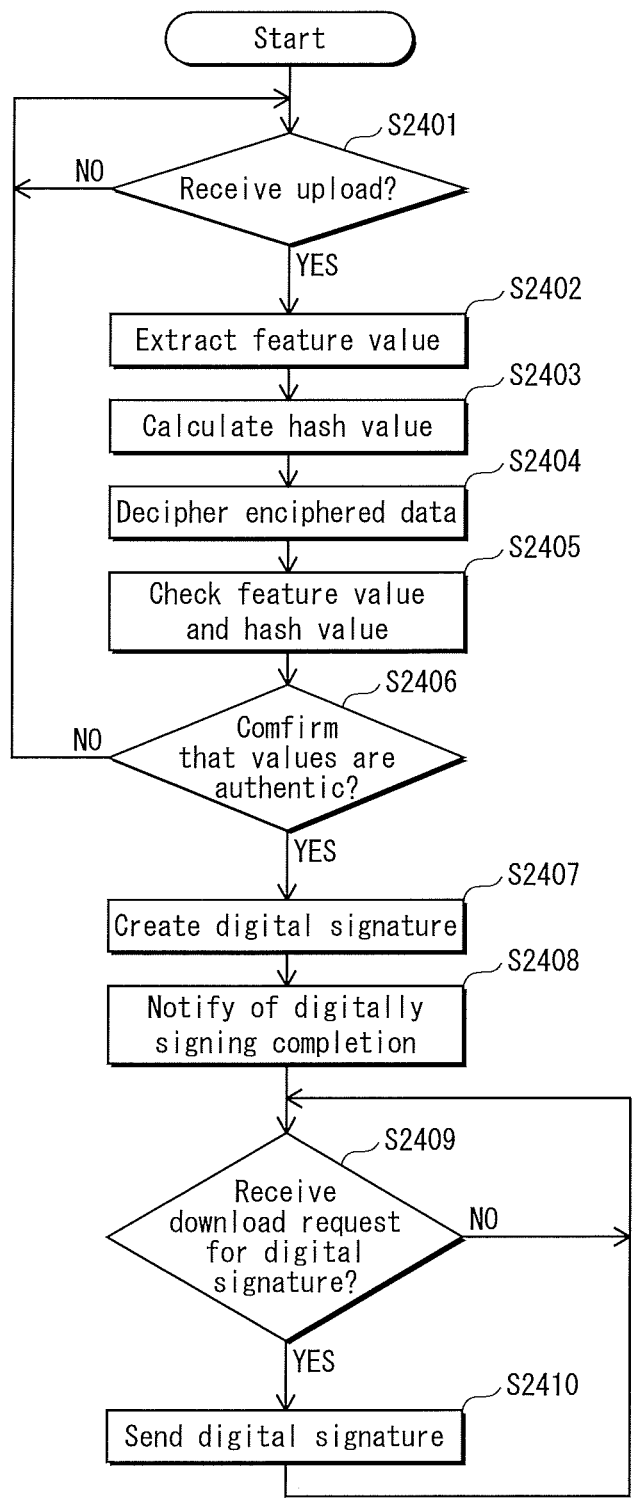
FIG. 24 is a flowchart showing operations of a contract creation server 110 relating to the third embodiment.

As shown in FIG. 24, upon receiving upload of the signature images AS and BS and the enciphered data pieces DataA and DataB from the tablet terminals 130 (Step S2401: YES), the contract creation server 110 extracts the feature values A0 and B0 from the signature images AS and BS, respectively (Step S2402), and calculates the hash value H0 of the contract body (Step S2403).

Then, the contract creation server 110 deciphers the enciphered data pieces DataA and DataB and thus to acquire the feature values A0 and B0 and the hash values H0 (Step S2404). The contract creation server 110 checks whether or not the extracted feature values A0 and B0 and the calculated hash value H0 match the feature values A0 and B0 and the hash values H0, which are acquired by deciphering the enciphered data pieces DataA and DataB, respectively (Step S2405). Then, if checking that feature values match each other and the hash values match each other (Step S2406: YES), the contract creation server 110 creates the digital signature S (Step S2407), and sends a digitally signing completion notification to the tablet terminals 130 (Step S2408).

Upon receiving a download request for the digital signature S from any tablet terminal 130 (Step S2409: YES), the contract creation server 110 sends the digital signature S to the tablet terminal 130 (Step S2410).

(3) Operations of Tablet Terminal 130

Next, description is given on the operations of the tablet terminal 130.

Figure 25:
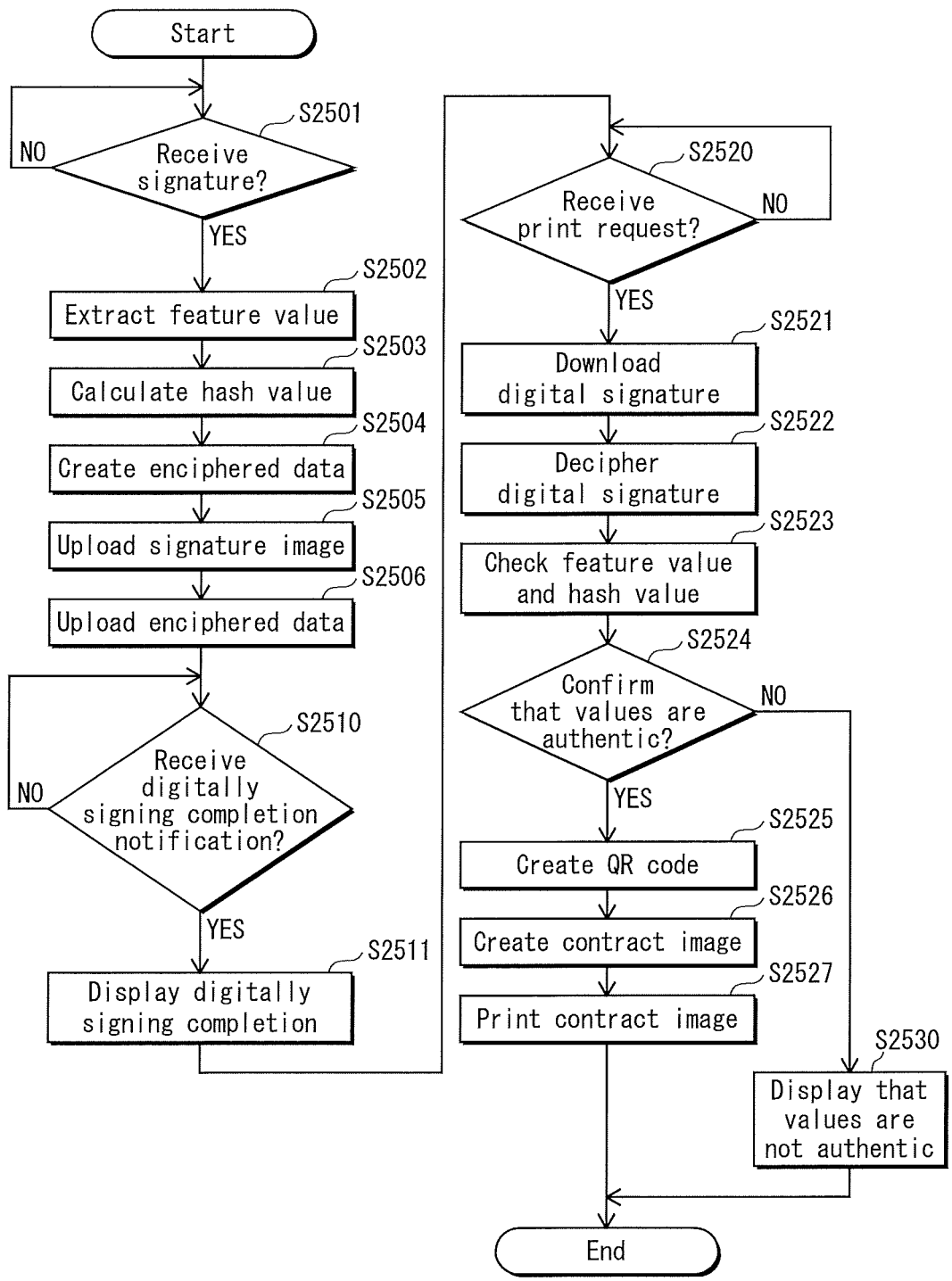
FIG. 25 is a flowchart showing operations of a tablet terminal 130 relating to the third embodiment.

As shown in FIG. 25, upon receiving a corresponding one of the handwritten signatures 210A and 210B (Step S2501: YES), the tablet terminals 130A and 130B extract the feature values A0 and B0 from the signature images AS and BS of the handwritten signatures 210A and 210B, respectively (Step S2502), calculate the hash value of the contract body (Step S2503), and encipher the feature values A0 and B0 and the hash value H0 with the private keys AX and BX of the parties A and B, respectively, and thus to create the enciphered data pieces DataA and DataB (Step S2504). Then, the tablet terminal 130 uploads the signature image onto the contract creation server 110 (Step S2505), and uploads the enciphered data onto the contract creation server 110 (Step S2506).

Upon receiving a digitally signing completion notification from the contract creation server 110 (Step S2510: YES), the tablet terminal 130 displays a message indicating that digitally signing is complete to the party (Step S2511).

Upon receiving a request to print the contract from either party (Step S2520: YES), the tablet terminal 130 downloads the digital signature S from the contract creation server 110 (Step S2521), and deciphers the digital signature S with the public key SY of the contract creation server 110 and the respective public keys AY and BY of the parties A and B, and thus to acquire the feature values A0 and B0 and the hash values H0 (Step S2522). The tablet terminal 130 checks whether or not the deciphered feature values A0 and B0 and hash values H0 are authentic (Step S2523). If the feature values and the hash value are not authentic (Step S2524: NO), the tablet terminal 130 displays a message indicating that the deciphered feature values and hash value are not authentic (Step S2530), and ends the processing.

If the deciphered feature values and hash values are confirmed as being authentic (Step S2524: YES), the tablet terminal 130 creates the QR code data C3 from the digital signature S (Step S2525). The contract image creation unit 709 creates a contract image from the contract body, the signature images AS and BS, and the QR code data C3 (Step S2526). The tablet terminal 130 sends the contract image to the MFP 501, and then contract image is printed (Step S2527).

(4) Case where the Number of Parties is there or More

Although the above description has been given taking as an example the case where the number of parties is two, it is possible to perform contract creation also in the case where the number of parties is three or more.

Figure 26A:
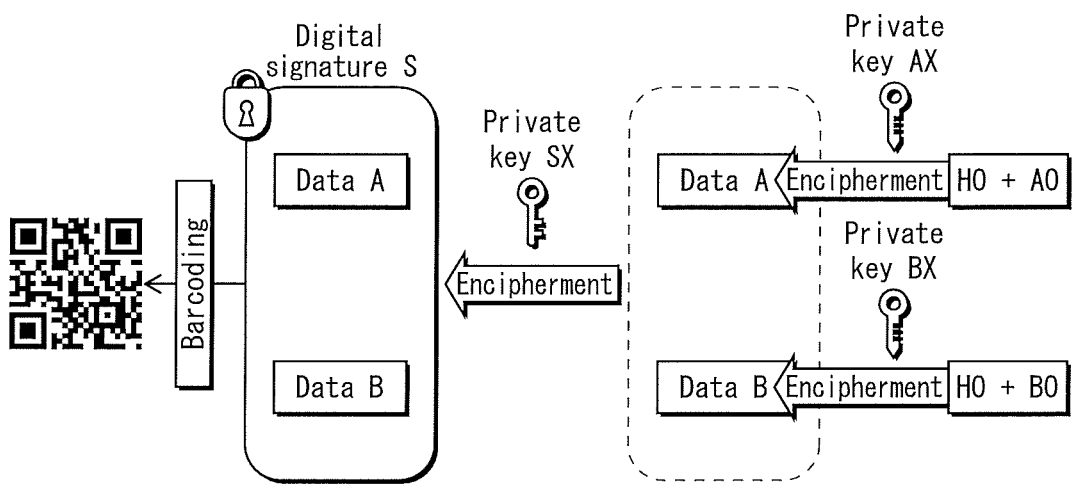
FIG. 26A describes a method of creating a digital signature S in the case where there are two parties to a contract.

In the case where there are two parties A and B, the digital signature S is created as shown in FIG. 26A by encrypting the enciphered data pieces DataA and DataB with the private key SX of the contract creation server 110. The enciphered data DataA is created by encrypting the hash value H0 of the contract body and the feature value A0 of the signature image AS of the party A with the private key AX of the party A. The enciphered data DataB is created by encrypting the hash value H0 and the feature value B0 of the signature image BS of the party B with the private key BX of the party B.

Figure 26B:
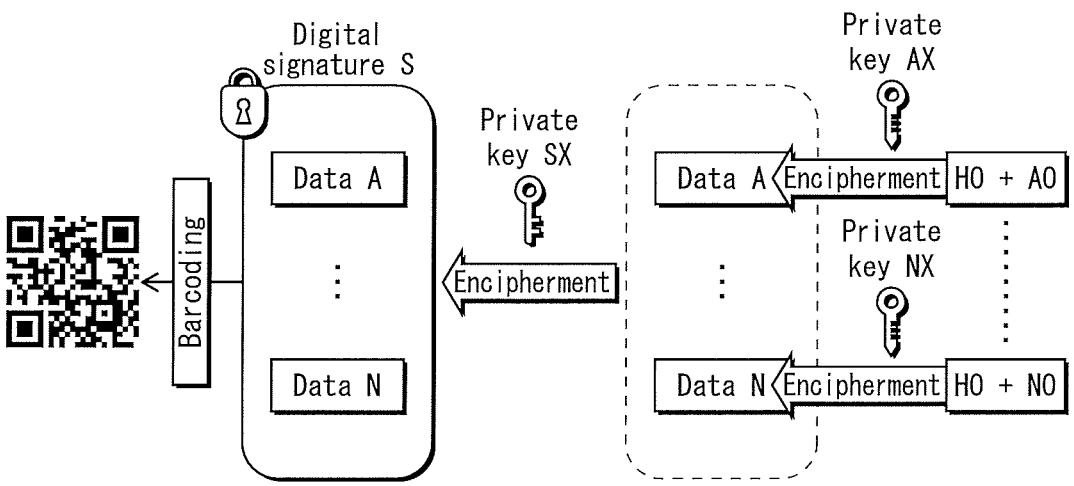
FIG. 26B describes a method of creating a digital signature S in the case where there are N parties to a contract.

In the case where there are three or more parties A to N, the digital signature S should be created as shown in FIG. 26B by encrypting the enciphered data DataA to DataN with the private key SX of the contract creation server 110. The enciphered data pieces DataA to DataN are each created by encrypting the hash value H0 of the contract body and a corresponding one of the respective feature values A0 to N0 of the signature images AS to NS with a corresponding one of the respective private keys AX to MX of the parties A to N.

Also in this case, the QR code data C3 is created from the digital signature S, and the QR code corresponding to the QR code data C3 is printed in the contract. The contract guarantees that the parties A to N have signed the contract in agreement to the contract content.

This reduces the processing load of the tablet terminals 130. Also, an amount of communication between the tablet terminal 130 and the contract creation server 110 is reduced, and therefore the load of a communication network is reduced and leakage of information through communication is prevented.

[4] Modifications

Although the present invention has been explained based on the above embodiments, the present invention is of course not limited to the above embodiments. The present invention includes the following modifications.

(1) In the above embodiments, the description has been given taking as an example the case where a digital signature is converted into a QR code. However, the present invention is of course not limited to this. Alternatively, other two-dimensional codes or barcodes may be used. Alternatively, other optical marks may be used. Also, the description has been given taking as an example the case where one QR code is printed for each handwritten signature. Alternatively, a plurality of QR codes may be printed for each handwritten signature. Needless to say, however, a print area of optical marks should preferably be small as much as possible.

(2) In the above embodiments, the description has been given taking as an example the case where a QR code of a digital signature is printed on a contract. However, the present invention is of course not limited to this. Alternatively, a QR code of a text of a contract body may be printed on the contract in addition to the QR code of the digital signature. By printing the QR code of the text on the contract, it is possible to check whether or not the contract body has been tampered with after creation of the QR code.

(3) In the above embodiments, the description has been given taking as an example the case where parties each use a tablet terminal. However, the present invention is of course not limited to this. Alternatively, the parties each may use a terminal device such as a personal computer other than a tablet terminal. Note that the terminal device to be used by the user needs to be capable of receiving input of a text such as a contract body, a handwritten signature, and so on.

(4) In the above embodiments, the description has been given taking as an example the case where a single server device is used as a contract creation server. However, the present invention is of course not limited to this. Alternatively, the contract creation server may be a cloud server that is composed of a plurality of server devices. Also, even in the case where a contract image is created by tablet terminals directly communicating with one another, without using the contract creation server, the same effect of the present invention is exhibited.

(5) In the above embodiments, the description has been given taking as an example the case where, in order to detect whether or not a text of a contract body has been tampered with, a hash value that is calculated from the text is used as information for uniquely identifying the text. However, the present invention is of course not limited to this. Alternatively, a value that is calculated by other one-way function may be used instead of the hash value. Further alternatively, even in the case where other information for uniquely identifying the text, which is not calculated by any one-way function, is used, the same effect of the present invention is exhibited.

(6) In the above embodiments, the description has been given on the contract creation system. However, the present invention is not limited to this. Alternatively, the present invention may be a program for causing a computer to operate as the contract creation system or a digital signal composed of the program. Further alternatively, the present invention may be a computer-readable recording medium that records therein the program or the digital signal, such as a flexible disk, a hard disk, a CD-ROM, an MO, a DVD, a DVD-ROM, a DVD-RAM, a BD (Blu-ray Disc), and a semiconductor memory. Still alternatively, the present invention may be the program or the digital signal that is transmitted via an electric communication network, a wireless or wired communication network, a network such as the Internet, or the like. Yet alternatively, the present invention may be a computer system that includes a microprocessor and a memory, the memory recording therein the program, the microprocessor operating in accordance with the program. Alternatively, the present invention may be implemented by another independent computer system, by transmitting the program or the digital signal that is recorded in the recording medium to the other computer system, or by transmitting the program or the digital signal to the other computer system via the network, or the like.

[5] Summary

One aspect of the present invention provides a non-transitory computer-readable recording medium that records therein a contract creation program for creating a contract image of a contract that is executed by parties each having a private key, the contract creation program causing a computer to perform the steps of: creating, for each of the parties, a signature image of a handwritten signature of the party; creating, for each of the parties, signature identification information for uniquely identifying the signature image of the party; creating text identification information for uniquely identifying a text of a body of the contract; creating, for each of the parties, an intermediate cipher by enciphering the signature identification information of the party and the text identification information with the private key of the party; creating, for each of the parties, a final cipher by enciphering the signature identification information of the party and the respective intermediate ciphers relating to all other of the parties with the private key of the party; creating an optical mark from each of the final ciphers; and creating the contract image in which the text, the respective signature images of the parties, and the optical marks are disposed in respective predetermined columns. With this configuration, it is possible to create a contract by sending and receiving electronic data between parties via the Internet or the like, thereby reducing the time required for contract execution. Also, the contract can be saved as a paper material. Accordingly, compared with the case where the contract is saved as electronic data, a server with a high security and its maintenance are not required, and this achieves a high security at a low cost.

Another aspect of the present invention provides a non-transitory computer-readable recording medium that records therein a contract creation program for creating a contract image of a contract that is executed by one party having a private key and one or more other parties each having a private key, the contract creation program causing a computer to perform the steps of: creating a signature image of a handwritten signature of the one party; creating first signature identification information for uniquely identifying the signature image of the one party; creating first text identification information for uniquely identifying a text of a body of the contract; creating a first intermediate cipher by enciphering the first signature identification information and the first text identification information with the private key of the one party, and sending the first intermediate cipher to each of the other parties; receiving a second intermediate cipher from each of the other parties; creating a first final cipher by enciphering the first signature identification information and the respective second intermediate ciphers received from the other parties with the private key of the one party, and sending the first final cipher to each of the other parties; receiving a second final cipher from each of the other parties; creating an optical mark from each of the first final cipher and the second final ciphers; and creating a contract image in which the text, the respective signature images of the one party and the other parties, and the optical marks are disposed in respective predetermined columns.

Also, the contract creation program may further cause the computer to perform the steps of: sending the signature image of the one party to each of the other parties; deciphering, for each of the other parties, the second intermediate cipher with a public key of the other party to acquire second signature identification information and second text identification information; receiving, from each of the other parties, a signature image of the other party to create third signature identification information for uniquely identifying the signature image of the other party; checking, for each of the other parties, whether or not the second signature identification information matches the third signature identification information and whether or not the first text identification information matches the second text identification information; deciphering, for each of the other parties, the second final cipher received from the other party with the public key of the other party to acquire a third intermediate cipher and fourth signature identification information; and checking, for each of the other parties, whether or not the second intermediate cipher matches the third intermediate cipher and whether or not the third signature identification information matches the fourth signature identification information, wherein the first final cipher may be created when, for each of the other parties, the second signature identification information matches the third signature identification information and the first text identification information matches the second text identification information, and the optical marks may be created when, for each of the other parties, the second intermediate cipher matches the third intermediate cipher and the third signature identification information matches the fourth signature identification information.

Also, the contract creation program may further cause the computer to perform the step of prohibiting creation of the first final cipher when, for each of the other parties, the second signature identification information does not match the third signature identification information and the first text identification information does not match the second text identification information.

Also, the contract creation program may further cause the computer to perform the step of prohibiting creation of the optical marks when, for each of the other parties, the second intermediate cipher does not match the third intermediate cipher and the third signature identification information does not match the fourth signature identification information.

Also, the signature identification information may be a feature value that is extracted from the signature image.

Also, the text identification information may be a one-way function value that is calculated from the text by a one-way function.

Also, the one-way function may be a hash function.

Also, the contract creation program may further cause the computer to perform the step of creating an optical mark that records therein the text of the body, wherein the content image may be created so as to further include the optical mark that records therein the text of the body and is disposed in a predetermined column.

Further another aspect of the present invention provides a non-transitory computer-readable recording medium that records therein a contract verification program for verifying a contract image of a contract in which a text of a body of the contract, respective signature images of handwritten signatures of parties each having a private key, and at least one optical mark relating to the parties are disposed in respective predetermined columns, the contract verification program causing a computer to perform the steps of: creating first signature identification information from the signature image of one of the parties; creating first text identification information from the text; deciphering the optical mark to acquire a final cipher; deciphering the final cipher with a public key of the one party to acquire an intermediate cipher and second signature identification information; deciphering the intermediate cipher with the public key of the one party to acquire third signature identification information and second text identification information; and checking whether or not the first text identification information matches the second text identification information and whether or not the first signature identification information, the second signature identification information, and the third signature identification information match one another.

Also, the contract image may further include an optical mark that is disposed in a predetermined column, the optical mark recording therein the text of the body of the contract, the contract verification program may further causes the computer to perform the step of creating third text identification information from the optical mark recording therein the text, and the checking further may check whether or not the first text identification information, the second text identification information, and the third text identification information match one another.

Still another aspect of the present invention provides a non-transitory computer-readable recording medium that records therein a final cipher creation program for a contract image creation device to create a final cipher, the final cipher being for creating an optical mark to be included in a contract image of a contract that is executed by parties each having a private key, the final cipher creation program causing a computer to perform the steps of: receiving, from each of the parties, an intermediate cipher that is created by enciphering signature identification information and text identification information with the private key of the party, the signature identification information being for uniquely identifying a signature image of a handwritten signature of the party, the text identification information being for uniquely identifying a text of a body of the contract; creating a final cipher by enciphering the respective intermediate ciphers relating to the parties with a private key that is other than the respective private keys of the parties; and sending the final cipher in response to a request from the contract image creation device.

Yet another aspect of the present invention provides a contract creation system that creates a contract image of a contract that is executed by parties each having a private key, the contract creation system comprising: a signature image creation unit that creates, for each of the parties, a signature image of a handwritten signature of the party; a signature identification information creation unit that creates, for each of the parties, signature identification information for uniquely identifying the signature image of the party; a text identification information creation unit that creates text identification information for uniquely identifying a text of a body of the contract; an intermediate cipher creation unit that creates, for each of the parties, an intermediate cipher by enciphering the signature identification information of the party and the text identification information with the private key of the party; a finer cipher creation unit that creates, for each of the parties, a final cipher by enciphering the signature identification information of the party and the respective intermediate ciphers relating to all other of the parties with the private key of the party; an optical mark creation unit that creates an optical mark from each of the final ciphers; and a contract image creation unit that creates the contract image in which the text, the respective signature images of the parties, and the optical marks are disposed in respective predetermined columns.

One aspect of the present invention provides a contract creation system that creates a contract image of a contract that is executed by one party having a private key and one or more other parties each having a private key, the contract creation system comprising: a signature image creation unit that creates a signature image of a handwritten signature of the one party; a signature identification information creation unit that creates first signature identification information for uniquely identifying the signature image of the one party; a text identification information creation unit that creates first text identification information for uniquely identifying a text of a body of the contract; an intermediate cipher sending unit that creates a first intermediate cipher by enciphering the first signature identification information and the first text identification information with the private key of the one party, and sends the first intermediate cipher to each of the other parties; an intermediate cipher reception unit that receives a second intermediate cipher from each of the other parties; a final cipher sending unit that creates a first final cipher by enciphering the first signature identification information and the respective second intermediate ciphers received from the other parties with the private key of the one party, and sends the first final cipher to each of the other parties; a final cipher reception unit that receives a second final cipher from each of the other parties; an optical mark creation unit that creates an optical mark from each of the first final cipher and the second final ciphers; and a contract image creation unit that creates a contract image in which the text, the respective signature images of the one party and the other parties, and the optical marks are disposed in respective predetermined columns.

Also, the contract creation system may further comprise: a signature image sending unit that sends the signature image of the one party to each of the other parties; an intermediate cipher decipherment unit that deciphers, for each of the other parties, the second intermediate cipher with a public key of the other party to acquire second signature identification information and second text identification information; a third signature identification information creation unit that receives, from each of the other parties, a signature image of the other party to create third signature identification information for uniquely identifying the signature image of the other party; an intermediate check unit that checks, for each of the other parties, whether or not the second signature identification information matches the third signature identification information and whether or not the first text identification information matches the second text identification information; a final cipher decipherment unit that deciphers, for each of the other parties, the second final cipher received from the other party with the public key of the other party to acquire a third intermediate cipher and fourth signature identification information; and a final check unit that checks, for each of the other parties, whether or not the second intermediate cipher matches the third intermediate cipher and whether or not the third signature identification information matches the fourth signature identification information, wherein the final cipher sending unit may create the first final cipher and sends the first final cipher to each of the other parties when, for each of the other parties, the intermediate check unit checks that the second signature identification information matches the third signature identification information and the first text identification information matches the second text identification information, and the optical mark creation unit may create the optical marks when, for each of the other parties, the final check unit checks that the second intermediate cipher matches the third intermediate cipher and the third signature identification information matches the fourth signature identification information.

Also, the contract creation system may further comprise a first prohibition unit that prohibits creation of the first final cipher when, for each of the other parties, the intermediate check unit checks that the second signature identification information does not match the third signature identification information and the first text identification information does not match the second text identification information.

Also, the contract creation system may further comprise a second prohibition unit that prohibits creation of the optical marks when, for each of the other parties, the final check unit checks that the second intermediate cipher does not match the third intermediate cipher and the third signature identification information does not match the fourth signature identification information.

Also, the signature identification information may be a feature value that is extracted from the signature image.

Also, the text identification information may be a one-way function value that is calculated from the text by a one-way function.

Also, the one-way function may be a hash function.

Also, the contract creation may further comprise a second optical mark creation unit that creates an optical mark that records therein the text of the body, wherein the contract image creation unit may create the content image so as to further include the optical mark that records therein the text of the body and is disposed in a predetermined column.

Further another aspect of the present invention provides a contract verification system that verifies a contract image of a contract in which a text of a body of the contract, respective signature images of handwritten signatures of parties each having a private key, and at least one optical mark relating to the parties are disposed in respective predetermined columns, the contract verification system comprising: a signature identification information creation unit that creates first signature identification information from the signature image of one of the parties; a text identification information creation unit that creates first text identification information from the text; an optical mark decipherment unit that deciphers the optical mark to acquire a final cipher; a final cipher decipherment unit that deciphers the final cipher with a public key of the one party to acquire an intermediate cipher and second signature identification information; an intermediate cipher decipherment unit that deciphers the intermediate cipher with the public key of the one party to acquire third signature identification information and second text identification information; and a check unit that checks whether or not the first text identification information matches the second text identification information and whether or not the first signature identification information, the second signature identification information, and the third signature identification information match one another.

Also, the contract image may further include an optical mark that is disposed in a predetermined column, the optical mark recording therein the text of the body of the contract, the contract verification system may further comprise a third text identification information creation unit that creates third text identification information from the optical mark recording therein the text, and the check unit may further checks whether or not the first text identification information, the second text identification information, and the third text identification information match one another.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A non-transitory computer-readable recording medium that records therein a contract creation program for creating a contract image of a contract that is executed by parties each having a private key, the contract creation program causing a computer to perform the steps of:
    creating, for each of the parties, a signature image of a handwritten signature of a party from a touch panel;
    creating, for each of the parties, signature identification information for uniquely identifying the signature image of the party, the signature identification information being a feature value extracted from the signature image, the feature value being a characteristic of each stroke of the handwritten signature;
    creating text identification information for uniquely identifying a text of a body of the contract;
    creating, for each of the parties, an intermediate cipher by enciphering the signature identification information of the party and the text identification information with the private key of the party;
    creating, for each of the parties, a final cipher by enciphering the signature identification information of the party and the respective intermediate ciphers relating to all other of the parties with the private key of the party;
    receiving from one of the parties, a request to print the contract image;
    downloading a final cipher of the signature identification information of another of the parties;
    deciphering the final cipher of the signature identification information of the another of the parties with a public key of the another of the parties;
    receiving confirmation from each of the parties that the signature identification information of the another of the parties is authentic;
    creating an optical mark from each of the final ciphers; and
    creating the contract image in which the text, the respective signature images of the parties, and the optical marks are disposed in respective predetermined columns when the confirmation received from the each of the parties that the signature identification information of the another of the parties is authentic.

2. The recording medium of claim 1, wherein
    the text identification information is a one-way function value that is calculated from the text by a one-way function.

3. The recording medium of claim 1, wherein
    the contract creation program further causes the computer to perform the step of creating an optical mark that records in the optical mark the text of the body, wherein the content image is created so as to further include the optical mark that records in the optical mark the text of the body and is disposed in a predetermined column.

4. The recording medium of claim 1, further comprising: printing the contract image created by the contract creation program.

5. A contract creation system that creates a contract image of a contract that is executed by parties each having a private key, the contract creation system comprising:
   a signature image creation unit having a touch panel that creates, for each of the parties, a signature image of a handwritten signature of a party from the touch panel; and
   a processor configured to:
      create, for each of the parties, signature identification information for uniquely identifying the signature image of the party, the signature identification information being a feature value extracted from the signature image, the feature value being a characteristic of each stroke of the handwritten signature;
      create text identification information for uniquely identifying a text of a body of the contract;
      create, for each of the parties, an intermediate cipher by enciphering the signature identification information of the party and the text identification information with the private key of the party;
      create, for each of the parties, a final cipher by enciphering the signature identification information of the party and the respective intermediate ciphers relating to all other of the parties with the private key of the party;
      receive from one of the parties, a request to print the contract image;
      download a final cipher of the signature identification information of another of the parties;
      decipher the final cipher of the signature identification information of the another of the parties with a public key of the another of the parties;
      receive confirmation from each of the parties that the signature identification information of the another of the parties is authentic;
      create an optical mark from each of the final ciphers; and
      create the contract image in which the text, the respective signature images of the parties, and the optical marks are disposed in respective predetermined columns when the confirmation received from the each of the parties that the signature identification information of the another of the parties is authentic.

6. The contract creation system of claim 5, wherein the text identification information is a one-way function value that is calculated from the text by a one-way function.

7. The contract creation system of claim 6, wherein the one-way function is a hash function.

8. The contract creation system of claim 5, wherein the processor is further configured to:
   create an optical mark that records in the optical mark the text of the body; and
   create the content image so as to further include the optical mark that records in the optical mark the text of the body and is disposed in a predetermined column.

9. The contract creation system of claim 5, further comprising:
   a printer configured to print the contract image created by the contract creation system.

* * * * *